(12) United States Patent
Reddy et al.

(10) Patent No.: US 6,208,325 B1
(45) Date of Patent: Mar. 27, 2001

(54) IMAGE ROTATION FOR VIDEO DISPLAYS

(75) Inventors: Dayakar C. Reddy; Modugu V. Reddy, both of San Jose; Krishnan C. Dharmarajan, Fremont, all of CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 08/130,255

(22) Filed: Oct. 1, 1993

(51) Int. Cl.[7] .................................................. G09G 5/34
(52) U.S. Cl. ............................................. 345/126; 345/132
(58) Field of Search ................................. 345/126, 132, 345/152, 154, 3

(56) References Cited

U.S. PATENT DOCUMENTS 5,122,783   6/1992   Bassetti, Jr. .
5,185,602   2/1993   Bassetti, Jr. et al. .

OTHER PUBLICATIONS

"Crystal–Clear Presentations" by Suzanne Stefanac, Macworld, Jan. 1993, pp. 157–163.
Cirrus Logic Advance Data Book CL–GD6440, Jan. 1993, pp. 1–38.

*Primary Examiner*—Matthew Luu
(74) *Attorney, Agent, or Firm*—J. P. Violette; Peter Rutkowski; David L. Stewart

(57) ABSTRACT

An image displayed on a digital display such as a flat panel display is rotated while the same image is displayed on a cathode ray tube display in unrotated form. When image rotation is selected, the read address sequence into a frame buffer may be reversed and the bit read sequence may be reversed. Thus a frame of panel pixel data stored within the frame buffer of an external video memory may be scanned onto a flat panel to display a rotated image.

20 Claims, 22 Drawing Sheets

IMAGE ROTATION FOR VIDEO DISPLAYS

TECHNICAL FIELD

This invention relates to video display controller systems and devices, particularly to the simultaneous control of both CRT and flat panel displays (so-called "dual display"). More particularly, the invention relates to a video display controller which may selectively rotate an image on one display while maintaining the same image on another display in non-rotated form.

BACKGROUND ART

VGA CRT controllers usually provide a number of analog signals such as Red, Green, Blue, Horizontal Sync, and Vertical Sync to drive a CRT display. Flat panel display controllers usually provide digital signals to drive a flat panel display. A flat panel display interprets the digital signals in order to properly display an image. The type of digital signal generated by a flat panel display controller generally varies depending upon the type, model, and manufacturer of a flat panel display. Examples of types of flat panel displays are Electroluminescent (EL), Active and Passive Liquid Crystal Displays (LCD), Vacuum Fluorescent, Plasma, and Electrochromatic.

Flat panel displays may have various pixel formats. One common pixel format for a flat panel display matches a VGA CRT display having 640 columns of pixels horizontally and 480 rows of pixels vertically. Each pixel may consist of various number of subpixels. For example, each pixel of a color flat panel display may comprise red, green, and blue subpixels. Flat panel display resolution (pixel density) and the number of subpixels per pixel may vary.

The digital signal provided by a flat panel display controller may vary depending upon how a pixel may be defined and generated on a specified type of flat panel display. For example, in a monochrome (e.g., black and white) display a pixel may be a single element which turns light or dark (e.g., ON or OFF). Thus a single bit could represent a pixel element turned ON or OFF. FIG. 4A illustrates a single pixel which may be utilized in a black and white display.

In color and grayscale displays, a pixel may be made up of a number of subpixels as illustrated in FIG. 4B. FIG. 4B shows a color pixel in a flat panel display made of three color subpixels, one each of red, green, and blue. Each color subpixel may be represented by one bit of digital data such that a one would turn on the subpixel and a zero would turn off the subpixel. In this manner a three color pixel may be represented by three bits of data, one bit for each sub-pixel. The various states of the subpixels (ON or OFF) may generate up to $2^3$ or 8 colors. For example, in FIG. 4B, an orange pixel color may be generated by simultaneously turning on the red and green subpixels.

To achieve a greater number of colors, more bits may be used to represent a pixel on a flat panel display. Referring to FIG. 4C, six bits per pixel (i.e., six subpixels per pixel) may be used to generate a total of $2^6$ or 64 colors. FIG. 4D illustrates an embodiment where nine bits per pixel (i.e., nine subpixels per pixel) may be used to generate $2^9$ or 512 colors. Grayscale shading may also be accomplished electronically using so-called "dithering" techniques, varying the number of times a pixel may be ON or OFF over a given number of frames and pixel locations. To provide these shading effects in a monochrome display, using one subpixel per pixel, extra bits may be used. For example, two bits per pixel may be used to create $2^2$ or four grayscale shades, four bits may be used to create, $2^4$ or sixteen shades of grayscale, six bits for $2^6$ or 64 shades and so on. The dithering technique selectively switches ON or OFF a pixel over a number of frames. For example, in four bit grayscale, a pixel may be selectively turned ON or OFF over sixteen frames of image data. Due to the persistence of vision phenomenon, the eye interprets this selective switching as different shades of grey.

Color shading may also be accomplished using dithering techniques by varying the number of times a color subpixel may be turned ON or OFF during a varying number of frames. For example, 4 bit color shading may use 4 bits for each color subpixel red, green, and blue, for a total of twelve bits generating $2^{12}$ or 4096 colors. Thus, over sixteen frames, each color may be turned ON or OFF to acquire a desired intensity or shade of color. The element of time may be used to create the appearance of color shades to the human eye.

Other types of flat panel displays may generate more than two native shades per subpixel using a technique known as "panel grey scaling". These flat panel displays internally generate various shades for a subpixel which are native to the panel and do not use the electronic dithering techniques described above. Panel grey scaling uses multiple bits per subpixel to generate the various intensity levels used. For example, a three bit monochrome pixel may have three bits per subpixel (one subpixel per pixel) for a monochrome panel, providing $2^3$ or eight native grey scales. Similarly, a nine bit color pixel may have three bits per subpixel for a color flat panel display, generating $2^9$ or 512 native scales or shades of colors.

In Panel grey scaling all of the data bits, representing a shade or intensity of a pixel are directly provided to flat panel display. Thus, for panel grey scaling, more bits per pixel are processed by the video display controller, stored into video memory, and scanned out to the panel than in electronic grey scaling. For example, in electronic grey scaling, only one bit per subpixel may be used to perform electronic grey scaling or color shading. Panel grey scaling uses three or more bits per subpixel to directly generate color or monochrome grey scales on a panel.

Flat panel displays, such as the passive super-twist-nematic LCD, may be scanned in two different ways. Single scan flat panel displays are made of one panel utilizing one set of column drivers and one set of row drivers. One disadvantage of the single scan flat panel display may be the large resistance of the column wire stretching from top to bottom of flat panel display which may cause ghosting effects and slow response time. Dual scan flat panel displays reduce column resistance and improve response time. The dual scan flat panel display may be functionally equivalent to two single scan flat panel displays joined together creating one larger flat panel display. The separate panels may be referred to as the upper and lower panel half. Upper and lower panel halves have separate column and row drivers. Because the upper and lower panel halves have smaller heights, the column resistance for each half may be less, reducing ghosting effects and increasing response time.

A dual scan flat panel display uses a different scanning procedure than a single scan flat panel display. For example, in a dual scan flat panel display having a resolution of 640 columns×480 rows of pixels, the rows of pixels may be numbered from 0 to 479 from top to bottom, while the columns of pixels may be numbered from 0 to 639 from left to right. In order to reduce flicker, a dual scan flat panel display may begin scanning the upper and lower halves of the panel simultaneously from rows 0 and 240, at the top-left and middle-left corners. Scanning starts on row 0 and row 240 simultaneously followed by row 1 and 241 and so on until the last lines 239 and 639 are scanned.

A buffer memory may be used to store data from a portion of the previous CRT frame in order to display it on flat panel display. The buffer memory may be referred to as a frame buffer and may be usually a type of high speed high bandwidth video memory such as SRAM or DRAM. The panel frame buffer may share with the video memory a portion of buffer memory allocated to graphics for the CRT. A frame buffer may be sized differently to accommodate various panel types as well as a desired control mechanism.

Flat panel display controller circuits may convert binary information from the CPU into one of multiple formats of digital information for a particular flat panel display. The controller may be configured to provide the proper number of digital bits of output per pixel to operate with a particular type of panel. This information tells flat panel display controller how to turn on and off various intensity levels of each individual subpixel or pixel.

In some instances, it may be desirable to drive more than one display from one computer. For example, in a portable computer it may be desirable to simultaneously drive both a flat panel display and a CRT (so-called "dual displays"). A computer may use two separate display controller integrated circuits to drive dual displays. However, to reduce costs, increase reliability, and decrease the weight of portable computers, one display controller integrated circuit may be used to control both a flat panel display and a CRT display.

In addition, it may be desirable to rotate an image on either single or dual displays to change the orientation of the image. For example, it may be desirable to rotate an image 180° to invert the display, as shown in FIGS. 8A and 8B. The use of image rotation has many practical applications for portable computers, multi-media presentations, and for pen-based computers (so-called "personal assistants").

For example, if a document is faxed (facsimiled) upside down (bottom-side scanned first) into a computer fax modem it may be desirable to rotate the received image displayed on a computer display by rotating the image 180°. In another example, a sheet of paper may be scanned upside down on a flat bed scanner. In both these examples the image may use 180° rotation to be properly viewed.

In some instances, one may want to view an unrotated image (0° of rotation) on a computer CRT while rotating (rotating 180°) the same image displayed on a flat panel display. It may desirable to view an image on a CRT and simultaneously display the same image on a liquid crystal display (LCD) projection panel. The image may be projected from the LCD projection panel onto a flat wall or other appropriate surface. An LCD projection panel may be a color or monochrome translucent liquid crystal display which may be placed on the projection surface of a typical overhead projector. If the LCD projection panel is improperly oriented, the projected image may be rotated (upside down or rotated 180°). In order to correct the rotation, the LCD projection panel may be manually turned 180°, however a situation may arise where manual rotation of the projection panel may not be possible. Furthermore it may be easier to electronically rotate an inverted projected image into a non-inverted orientation.

Further, in so-called "multi-media" presentations, it may be desirable to display an image on an LCD flat panel display on a portable computer while displaying the same image on an LCD projection panel or large CRT. An individual making the presentation may wish to rotate either display to provide proper orientation for the image or to provide a special video effect.

Portable pen-based computers incorporating flat panel displays are designed such that the user holds flat panel display in one orientation. Typically, batteries are designed into the top of the pen-based computer to allow proper support, provide a comfortable weight balance, and improve the aesthetic appearance. Pen based computers may be designed to dock to a base computer or base CRT display. To reduce physical stress on flat panel display screen and the pen based computer, the pen based computer may be docked to a docking station in an orientation such that the batteries are at the bottom of the screen. Thus the image displayed on flat panel display may be displayed upside down (rotated 180°). To simultaneously display the image on the docking station CRT and flat panel display, it may be desirable to rotate flat panel display image once docked. Alternately, a flat panel display may be the sole screen used when docked to the docking station, and 180° rotation may be used when docked upside down.

In other instances, it may be desirable to use a portable computer on a desk, where two users are sitting on opposite sides of the desk. In order to allow both users to view the display, the computer may have to be turned around periodically, or in the alternative, one user would have to read upside-down. Thus it may be desirable to allow the user to flip flat panel display around a central axis (on a provided hinge) such that a user on the opposite side of the table may view the screen. Doing so, however may place the image upside down with respect to the other user. Thus it may be desirable to selectively rotate flat panel display image so both users can selectively view the image on flat panel display.

Prior techniques have been used for rotating an image displayed on a CRT display using software, however such techniques may take a considerable amount of time to rotate complex images. An image may also be rotated on a CRT display using hardware techniques, such as those incorporated in the TRW LSI (Raytheon) TMC2301 integrated circuit. One disadvantage of this hardware device is it only supports a CRT display using analog signals and does not provide digital signals to drive various flat panel displays.

DISCLOSURE OF THE INVENTION

An apparatus is provided to generate image data for simultaneously displaying a selectively rotated image on at least one display. A memory is provided for storing the image as pixel data for the display. A memory controller, coupled to the memory and the display, sequentially writes the pixel data to the memory in a first sequence and selectively reads the pixel data from the memory in the first sequence generating the image data or in a second sequence to selectively generate rotated image data.

A method is provided for displaying and selectively rotating an image on an image display unit. A frame of pixel data corresponding to the image is stored in a memory in a first sequence. A pixel of image data corresponding to the frame is selectively read from the memory in the first sequence or in a second sequence. The pixel of image data is then converted to display unit drive signals corresponding to the display unit.

It is an object of the present invention to selectively rotate an image on a video display.

It is another object of the present invention to selectively rotate an image displayed on a first display while displaying the unrotated image on a second display.

It is an object of the present invention to selectively rotate an image displayed on a digital display such as an LCD flat panel display.

It is another object of the present invention to selectively rotate an image displayed on a digital display while displaying the unrotated image on an analog display such as a CRT.

It is still another object of the present invention to provide image rotation for various digital display devices.

BEST MODE FOR CARRYING OUT THE INVENTION

Figure 9:
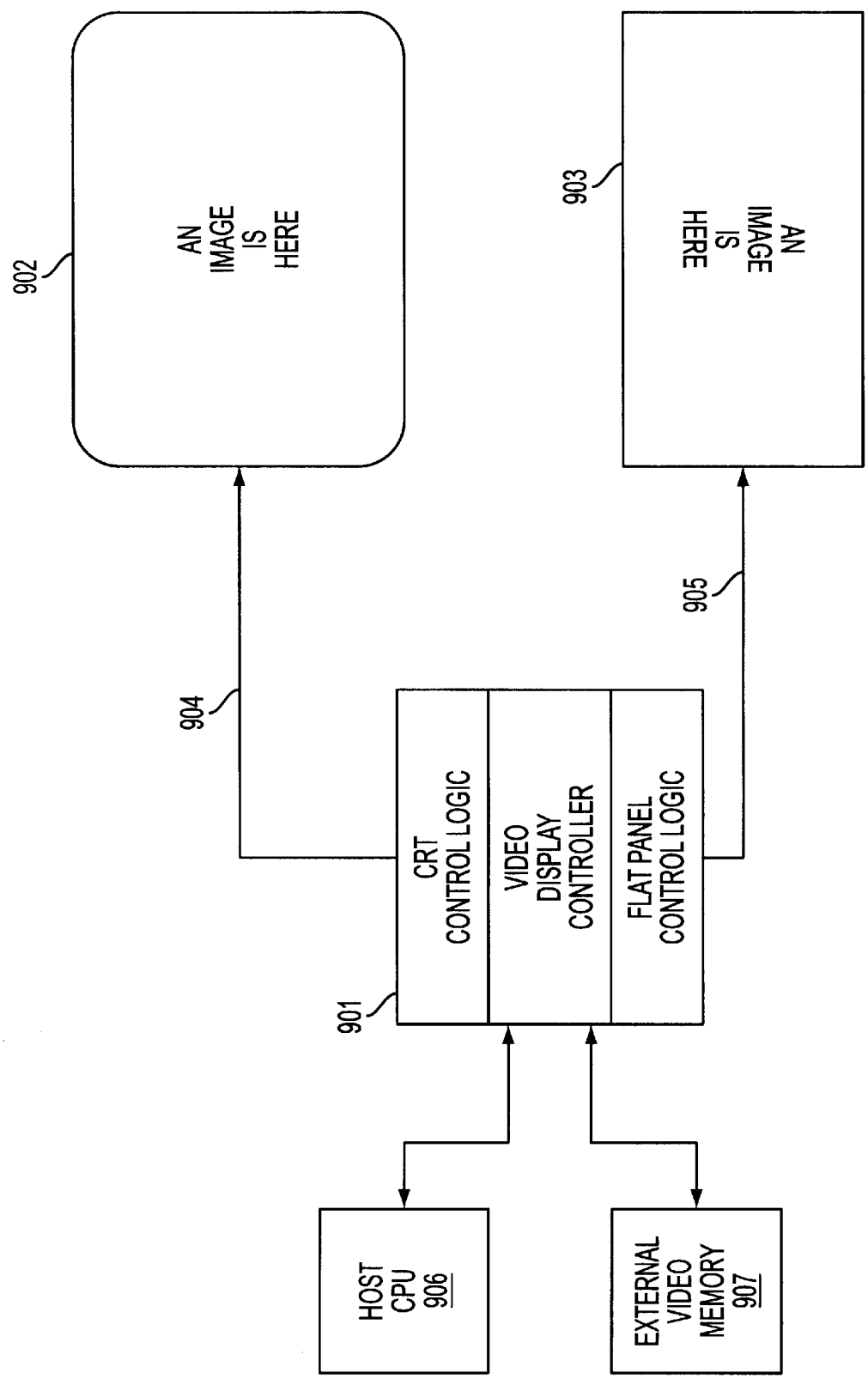
FIG. 9 is a block diagram illustrating a circuit controlling both a CRT display and a flat panel display.

In a first embodiment of the present invention, video display controller 901, as illustrated in FIG. 9, combines a CRT controller and a flat panel display controller into one integrated circuit. Video display controller 901 accepts commands from host CPU 906 to display images on either flat panel display 903, CRT 902, or both. Flat panel display 903 may comprise a single or dual scan monochrome or color flat panel display, as will be discussed in connection with the examples below. Video display controller 901 provides addresses and data information to external video memory 907 in order to display a desired image.

Figure 8A:
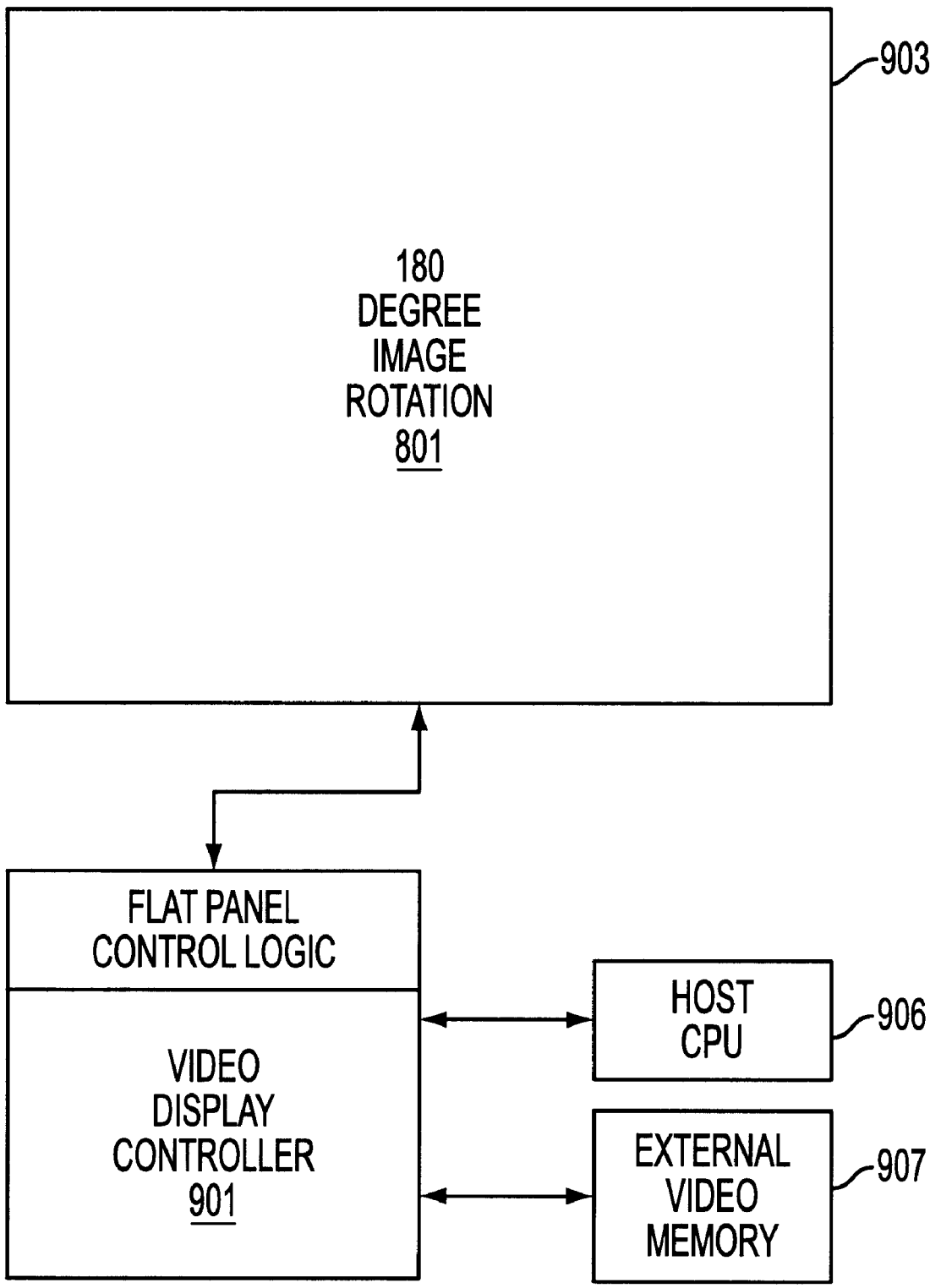
FIG. 8A is a block diagram illustrating how an image displayed on a flat panel display appears unrotated.
Figure 8B:
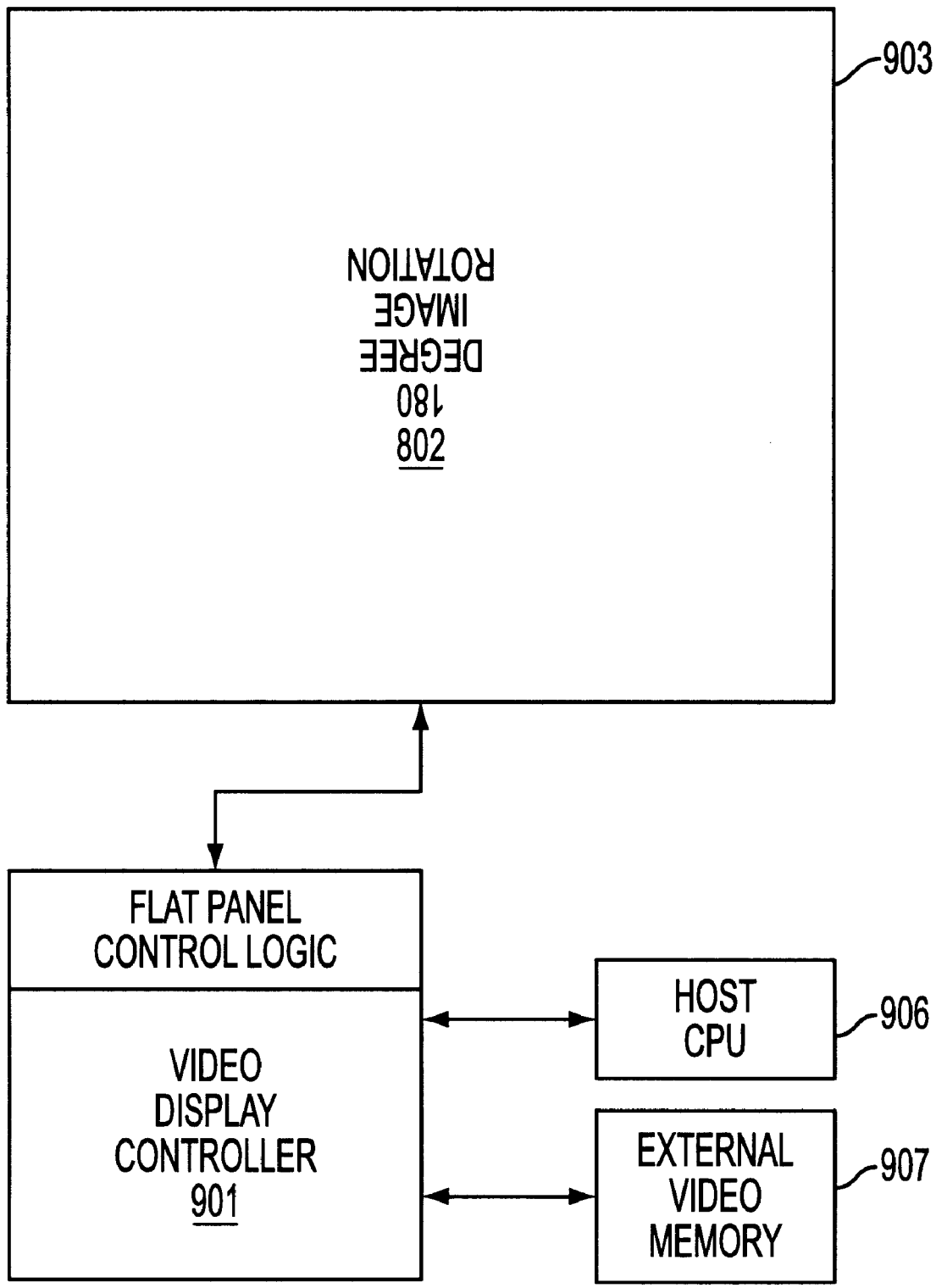
FIG. 8B is a block diagram illustrating how an image displayed on a flat panel display appears rotated.

The first embodiment of the present invention provides the capability of rotating the image on flat panel display 903. FIGS. 8A and 8B illustrate the final result of image rotation by comparing image 801 on flat panel display 903 in FIG. 8A with image 802 of flat panel display 903 in FIG. 8B. CRT 902 may be controlled by the video display controller 901 as illustrated in FIG. 9, such that an image displayed on CRT 902 may remain unrotated from flat panel display 903 when image rotation is selected. Image rotation may be accomplished by flat panel display control logic contained within the video display controller and video memory.

External video memory 907 allows devices to support frame buffering for flat panel display 903. The size of external video memory 907 needed to support frame buffering for flat panel display 903 may vary. Certain techniques may be used to more efficiently use video memory. Image rotation, as used in the first embodiment of the present invention, may use an allocation of two full frames of data space within external video memory 907. The technique of rotating an image reverses the order of addressing external video memory 907 from that used to write into external video memory 907. The portion of external video memory 907 used varies depending on the type of flat panel display 903 supported, as will be described in detail below.

Figure 11A:
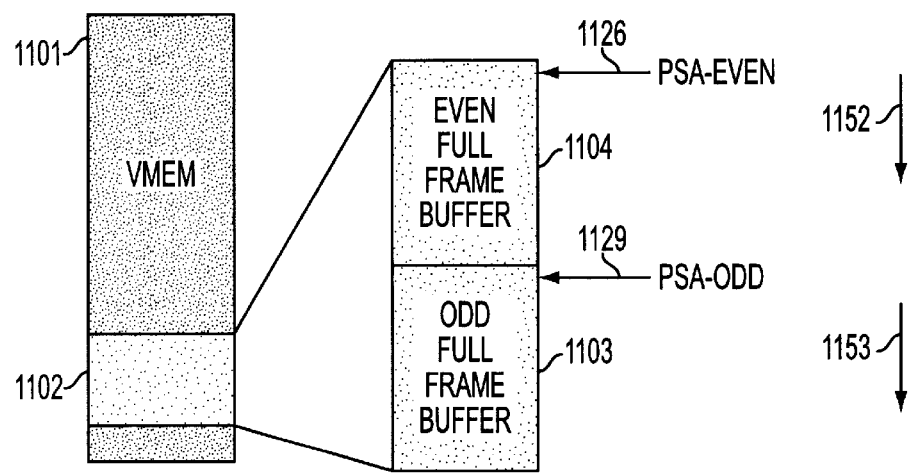
FIG. 11A is a diagram illustrating starting read addresses for even and odd full frame buffers for a single scan flat panel display.

Two full frames of memory space within external video memory 907 are referred to as even full frame buffer 1104 and odd full frame buffer 1103 as shown in FIG. 11a. First panel data may be stored into even full frame buffer 1104 while second panel data may be read from odd full frame buffer 1103 and scanned onto flat panel display 903. Second panel data may then be stored into odd full frame buffer 1103 while first panel data may be read from even full frame buffer 1104 and scanned onto flat panel display 903. Thus, even full frame buffer 1104 and odd full frame buffer 1103 alternately read and write as an image advances through frames of panel data.

Figure 11B:
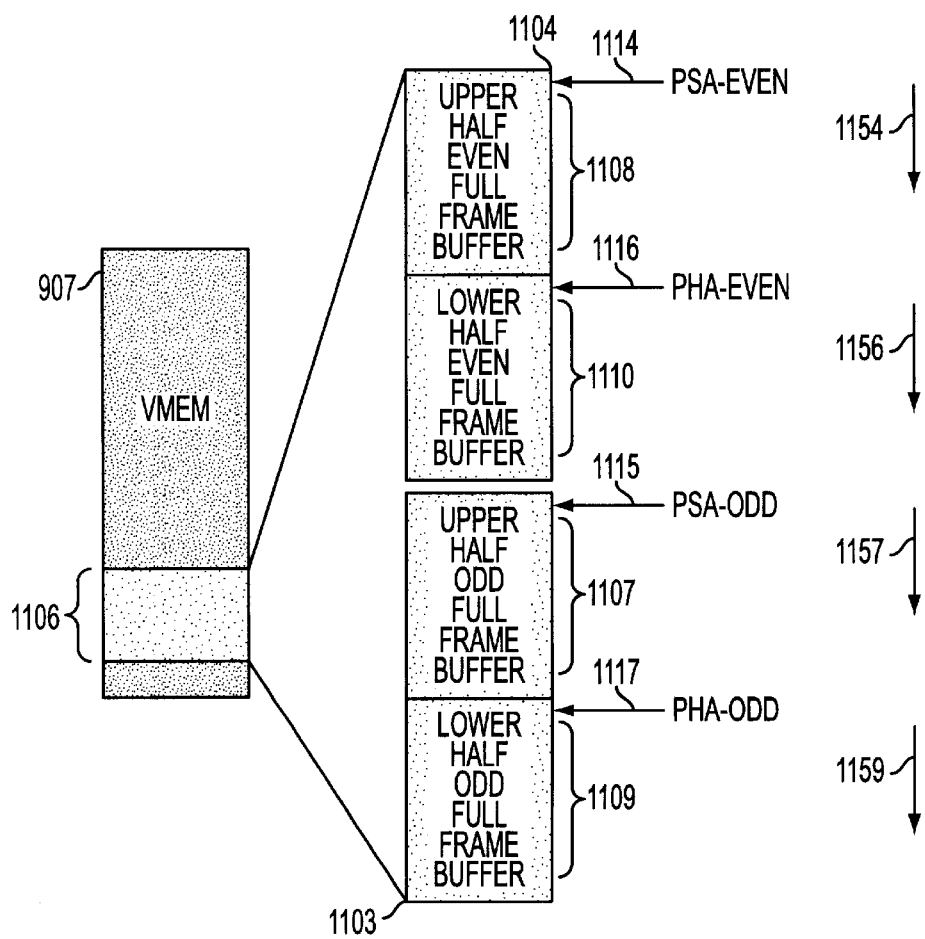
FIG. 11B is a diagram illustrating starting read addresses for upper and lower halves of even and odd full frame buffers for a dual scan flat panel display.

FIG. 11A illustrates how space in external video memory 907 may be allocated into even full frame buffer 1104 and odd full frame buffer 1103 for flat panel display 903 using single scan. FIG. 11B illustrates the allocation of space in external video memory 907 flat panel display 903 using dual scan. In FIG. 11B, even full frame buffer 1104 may be divided into upper half 1108 and lower half 1110, which correspond to upper and lower panel halves of an even frame displayed on a dual scan flat panel display 903. Odd full frame buffer 1103 may be divided into upper half 1107 and lower half 1109, which correspond to upper and lower panel halves of an odd frame displayed on a dual scan flat panel display 903. Other space within external video memory 907 may be allocated to support various types of CRT displays such as VGA or super VGA. To accomplish image rotation (e.g., 180° image rotation), addressing of external video memory 907 may be reversed for a read operation of even full frame buffer 1104 and odd full frame buffer 1103, providing a reversed read address sequence. The bit order may also be read in reverse, as illustrated by FIG. 11C for a flat panel display 903 using single scan and as illustrated by FIG. 11D for a flat panel display 903 using dual scan.

Figure 11C:
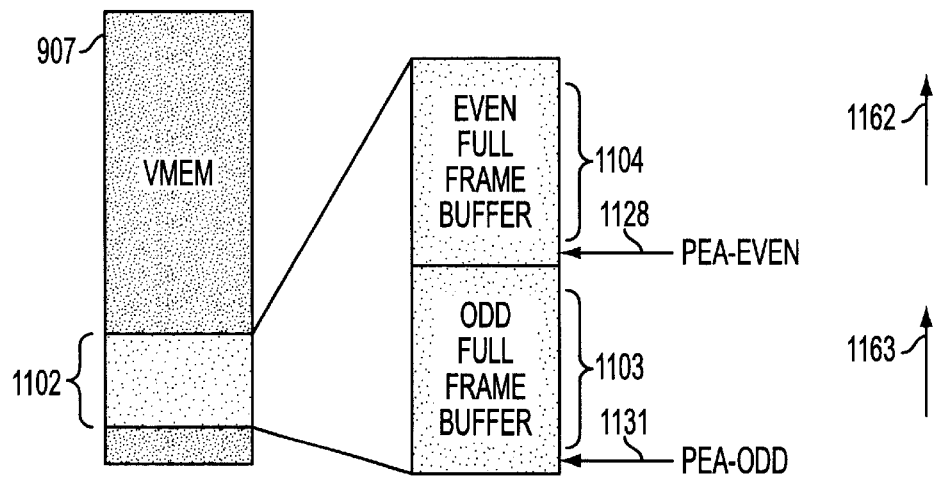
FIG. 11C is a diagram illustrating starting read addresses for even and odd full frame buffers when image rotation is selected for a single scan flat panel display.
Figure 11D:
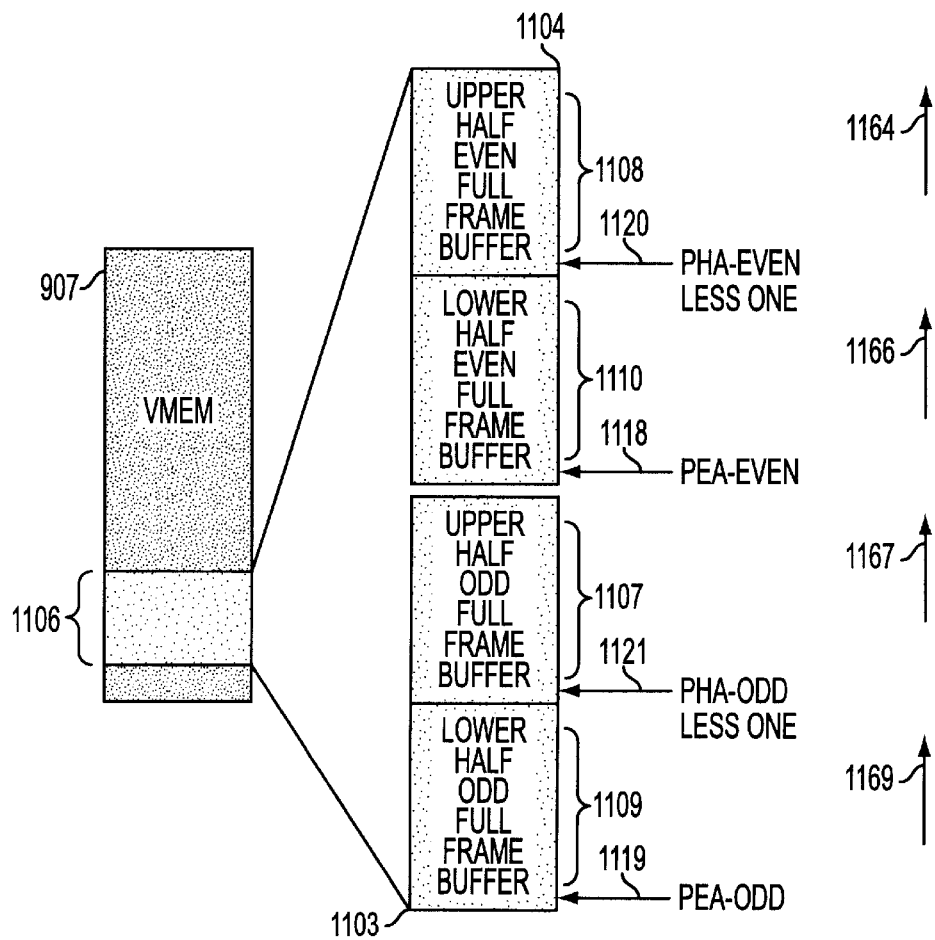
FIG. 11D is a diagram illustrating starting read addresses for upper and lower halves of even and odd full frame buffers when image rotation is selected for a dual scan flat panel display.

FIGS. 11A and 11C represent the same space 1102 in external video memory 907 containing the same even full frame buffer 1104 and odd full frame buffer 1103. In FIG. 11A the start addresses during the read operation are panel start address even PSA-EVEN 1126 for even full frame buffer 1104 and panel start address odd PSA-ODD 1129 for odd full frame buffer 1103. The read address are incremented from either of start addresses 1126 and 1129 as illustrated by down arrow 1152 and down arrow 1153. For example, if start address PSA-EVEN 1126 is 0 0000 hex then the next read address for even full frame buffer 1104 may be 0 0001 hex.

FIG. 11C illustrates the reverse read address sequence when image rotation is selected. Start addresses for a read operation of external video memory 907 are changed to panel end address even PEA-EVEN 1128 for even full frame buffer 1104 and panel end address odd PEA-ODD 1131 for odd full frame buffer 1103. The read addresses in this case are decremented from start addresses 1128 and 1131 reversing the read sequence as indicated by up arrows 1162 and 1163. For example, if PEA-EVEN 1128 is address 0 95FF hex, the next read address may be acquired by decrementing PEA-EVEN 1128 by one, producing 0 95FE hex. FIG. 11B illustrates full frame buffering for a dual scan flat panel display 903. Even full frame buffer 1104 and odd full frame buffer 1103 are conceptually split in half to support the upper and lower panel halves of flat panel display 903. An additional address pointer for the lower panel half provides even full frame buffer 1104 and odd full frame buffer 1103 into upper and lower halves. Start addresses for even full frame buffer 1104 are PSA-EVEN 1114 and panel half address even PHA-EVEN 1116. Starting addresses for odd full frame buffer 1103 are PSA-ODD 1115 and panel half address odd PHA-ODD 1117.

In unrotated mode, address sequences for even full frame buffer 1104 are indicated by down arrows 1154 and 1156. Address sequences for odd full frame buffer 1103 are indicated by down arrows 1157 and 1159. For example, if PSA-EVEN 1114 is 0 0000 hex and PHA-EVEN 1116 is 0 4B00 hex, then address logic for flat panel display 903 may first read PSA-EVEN 1114 address location and increment the address a few times. Next, read logic for flat panel display 903 toggles to PHA-EVEN 1116, reads the location and increments the address a few times in the lower half 1110 of even full frame buffer 1104 and then toggles back to the addresses of upper half 1108 of even full frame buffer 1104. The next address locations in each of these sequences may be acquired by incrementing each of these values by one. In this manner, the next two read address from the start addresses of even full frame buffer 1104 are 0 0001 hex and 0 4B01 hex.

FIG. 11D shows the same space 1106 in external video memory 907 containing the same upper half 1108 and lower half 1110 of even full frame buffer 1104 and upper 1107 and lower 1109 halves of odd full frame buffer 1103 as illustrated in FIG. 11B. However, FIG. 11D illustrates the modification to the start addresses to reverse the read sequence when selecting image rotation. Starting addresses for even full frame buffer 1104 are panel end address even PEA-EVEN 1118 and panel half address even less one PHA-EVEN LESS ONE 1120. In this case, image rotation causes the pixel data to scan the lower half 1110 of even full frame buffer 1104 onto an upper panel half of flat panel display 903 and scan the upper half 1108 of even full frame buffer 1104 onto the lower panel half of flat panel display 903. Thus, the first read address of even full frame buffer 1104 scanned onto an upper panel half may be PEA-EVEN 1118. The panel read address logic 1008 may then decrement from this value a few times and then toggle to PHA-EVEN LESS ONE 1120 of the upper half 1108 of even full frame buffer 1104. Panel read address logic 1008 decrements from this value a few times generating sequential read addresses and scanning the panel pixel data onto the lower panel half of flat panel display 903. Continuing with the example above where PHA-EVEN 1118 is 0 4B00 hex, assume PEA-EVEN 1118 is 0 95FF hex. Panel read address logic 1008 may compute new half panel start address PHA-EVEN LESS ONE 1121 from the PHA-EVEN 1118 by decrementing this value by one. Thus, PHA-EVEN LESS ONE 1121 may be computed to be 0 4AFF hex. Thus, the sequential address of upper half 1108 even full frame buffer 1104 starts at 0 4AFF hex and sequential address of lower half 1110 of even full frame buffer 1102 at 0 95FF hex. The next sequential addresses are generated by decrementing these values by one. In the example, the next sequential address into upper half 1108 of even full frame buffer 1104 is 0 4AFE hex. The next sequential address into lower half 1110 of the full frame buffer 1103 may be 0 95FE hex. The read address logic reads a couple of address locations in upper half 1108 of even full frame buffer 1104 and then toggles to read a couple of address locations in lower half 1110 of even full frame buffer 1104. The read address logic continues to toggle back and forth between upper half 1108 and lower half 1110 until all panel pixel data bits have been read from the even full frame buffer 1104. The process may then be repeated for odd full frame buffer 1103.

Single Scan Monochrome Flat Panel Display

Figure 1:
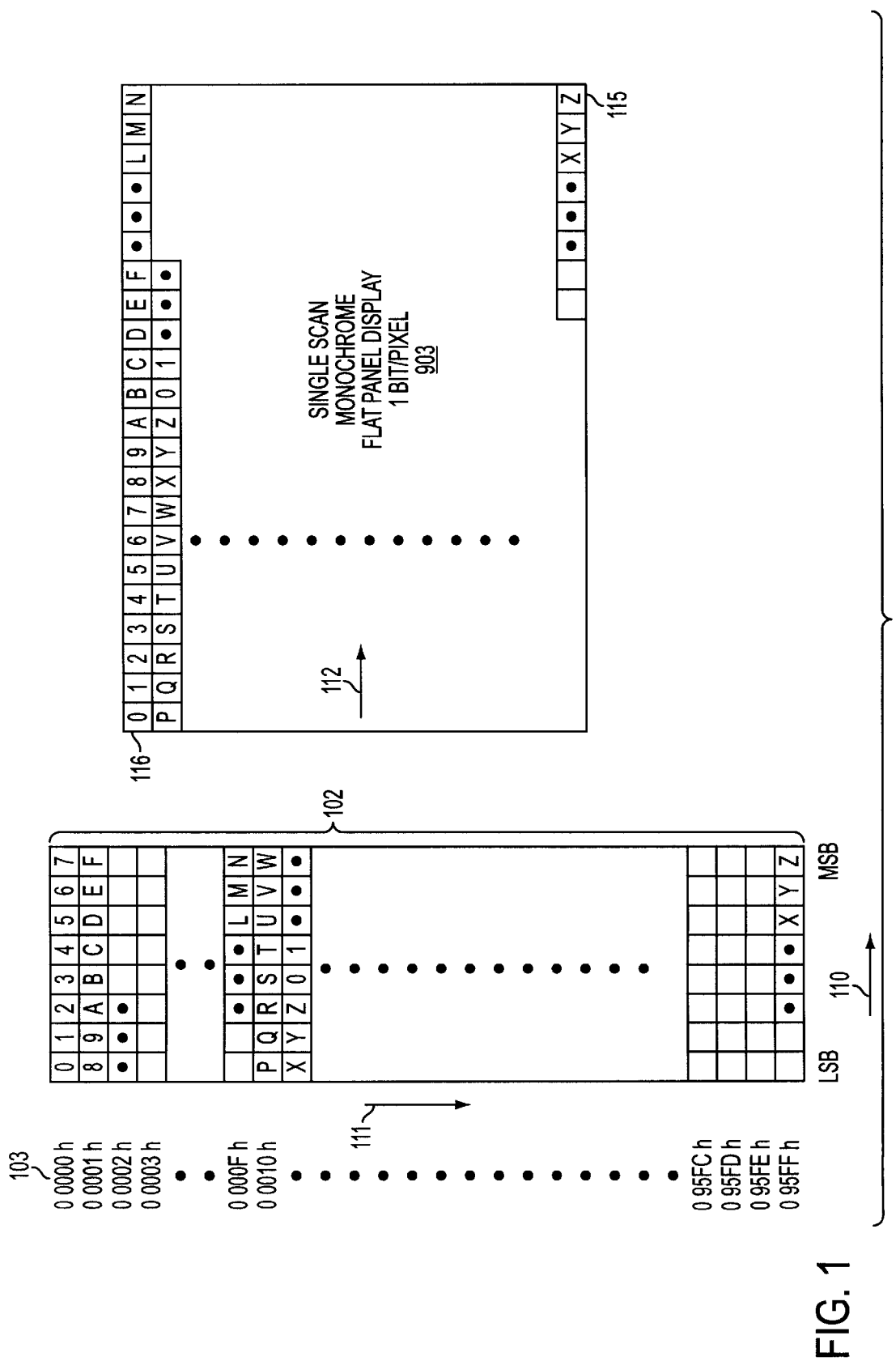
FIG. 1 is a diagram illustrating how bits within an even or odd full frame buffer are mapped onto pixel locations of a single scan monochrome flat panel display.

FIG. 1 illustrates how a single frame of an image stored in external video memory 907 may be scanned onto flat panel display 903, which in this instance may be a single scan monochrome flat panel display. Full frame buffer 102 represents either even full frame buffer 1104 or odd full frame buffer 1103 illustrated in FIG. 11A. Address locations 103 range from 0 0000 hex to 0 95FF hex, however, these addresses are merely exemplary of the possible range of sequential addresses.

As CRT 902 of FIG. 9 is scanned with a frame of CRT image data, the CRT image data may also be converted into panel image data and written into full frame buffer 102. When full frame buffer 102 is full, a frame of panel image data may then be scanned onto flat panel display 903 using the same address and bit sequence used in the write operation. The bit sequence serially reads data bits from LSB to MSB such as bit zero to bit seven. The address sequence may be from low to high such as from 0 0000 hex to 0 95FF hex. For example, both the write and read operations into external video memory 907 may scan data bits zero through seven of external video memory 907 as indicated by right arrow 110 in FIG. 1. The addresses may be sequentially incremented from 0 0000 hex to 0 95FF hex as indicated by down arrow 111. A single panel data bit read from full frame buffer 102 scanned out onto the flat panel display 903 may turn ON a single pixel if a bit is one or turn OFF a single pixel if a bit is zero.

Mapping of the bits during the read operation of external video memory 907 to scan bits onto flat panel display 903 may be similar to how CRT 902 of FIG. 9 is scanned by an electron beam. Pixels are scanned from left to right and from top to bottom. The first bit zero of a frame of panel image data starts at the uppermost-left-hand corner 116 of the panel. The pixels are turned ON within the display on each individual line or row from left to right as indicated by right arrow 112.

Upon reaching the end of a line (e.g., 640 columns), the panel starts writing the next line from the left most position of the panel. For example line one may start with pixel bits 0, 1, 2, and 3 at address 0 0000 and end with pixel bits L, M, and N at address 0 000F. Flat panel display 903 may then display line two with starting pixel bits P, Q, R, S, and T from address 0 0010. The frame may be completely written onto flat panel display 903 when pixel bit Z from address 0 95FF is scanned on to flat panel display 903 in lowest-right-hand corner 115.

The scan shown in FIG. 1 may be either an even or an odd frame which may be stored in external video memory 907. The next frame, either odd or even, may be read from external video memory 907 and scanned onto the panel in the same manner, at the same scan rate as CRT 902 of FIG. 9.

Figure 5:
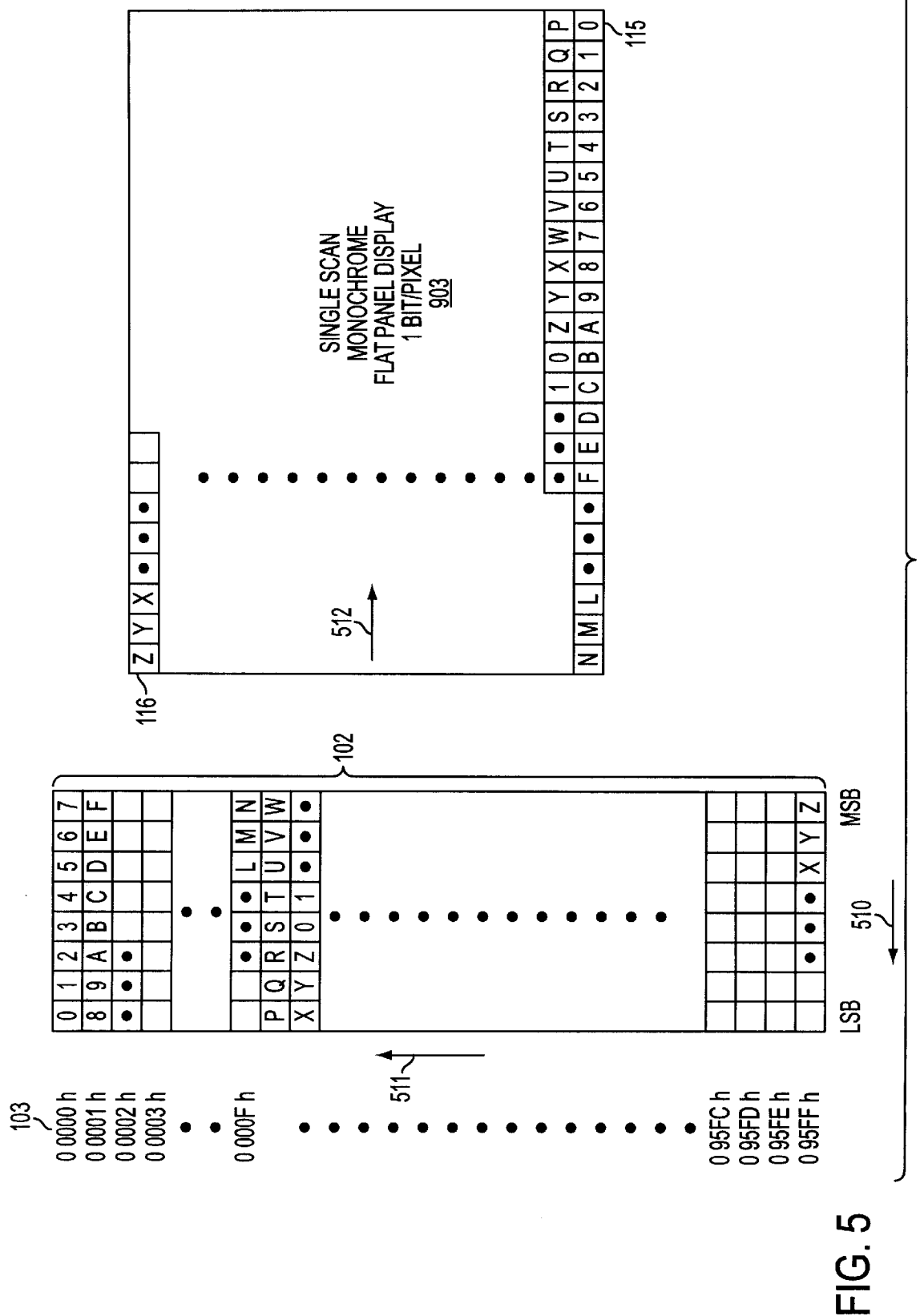
FIG. 5 is a diagram illustrating how bits, within an even or odd full frame buffer, are reverse mapped by the present invention onto pixel locations of a single scan monochrome flat panel display.

FIG. 5 illustrates how the sequence of read address locations may be remapped if selecting image rotation (e.g., 180° image rotation) where flat panel display 903 is a single scan, monochrome, single bit per pixel display. The image displayed on flat panel display 903 as shown in FIG. 5 may be rotated from that displayed on flat panel display 903 as shown of FIG. 1. During the read operation from full frame buffer 102 in external video memory 907, data bits are scanned onto flat panel display 903 so the image may be rotated.

As in FIG. 1, full frame buffer 102 represents either even full frame buffer 1104 or odd full frame buffer 1103. Addresses 103 may range from 0 0000 hex to 0 95FF hex for full frame buffer 102 for a particular panel type and VMEM bus width. Flat panel display 903 accepts bits from the controller and the pixel data bits are scanned onto flat panel display 903 from top to bottom and left to right in the same manner as in FIG. 1.

Panel data bits are written into full frame buffer 102 in the same fashion as in FIG. 1. However, when selecting image rotation, the read operation of full frame buffer 102 may be performed in reverse order such that the data bits turn ON or OFF the pixels of flat panel display 903 in a different order than in FIG. 1. During a reverse sequence read operation of full frame buffer 102, the first read address location may be 0 95FF hex and the first bit read may be bit seven, represented by pixel bit Z. The addresses progress sequentially from 0 95FF hex to 0 0000 hex as indicated by up arrow 511 in FIG. 5. Data bits are read from MSB to LSB (bit 7 to bit 0) as indicated by left arrow 510.

In FIG. 5 flat panel display 903 may be scanned from the uppermost left-hand corner 116 starting with pixel bits Z, Y and X from address 0 95FF, and finishing with pixel bits 2, 1, and 0 from address 0 0000, scanned into in lower right hand corner 115. The reverse reading sequence rotates the image on flat panel display 903 as indicated by image 802 in FIG. 8B.

Dual Scan Monochrome Panel

Figure 2:
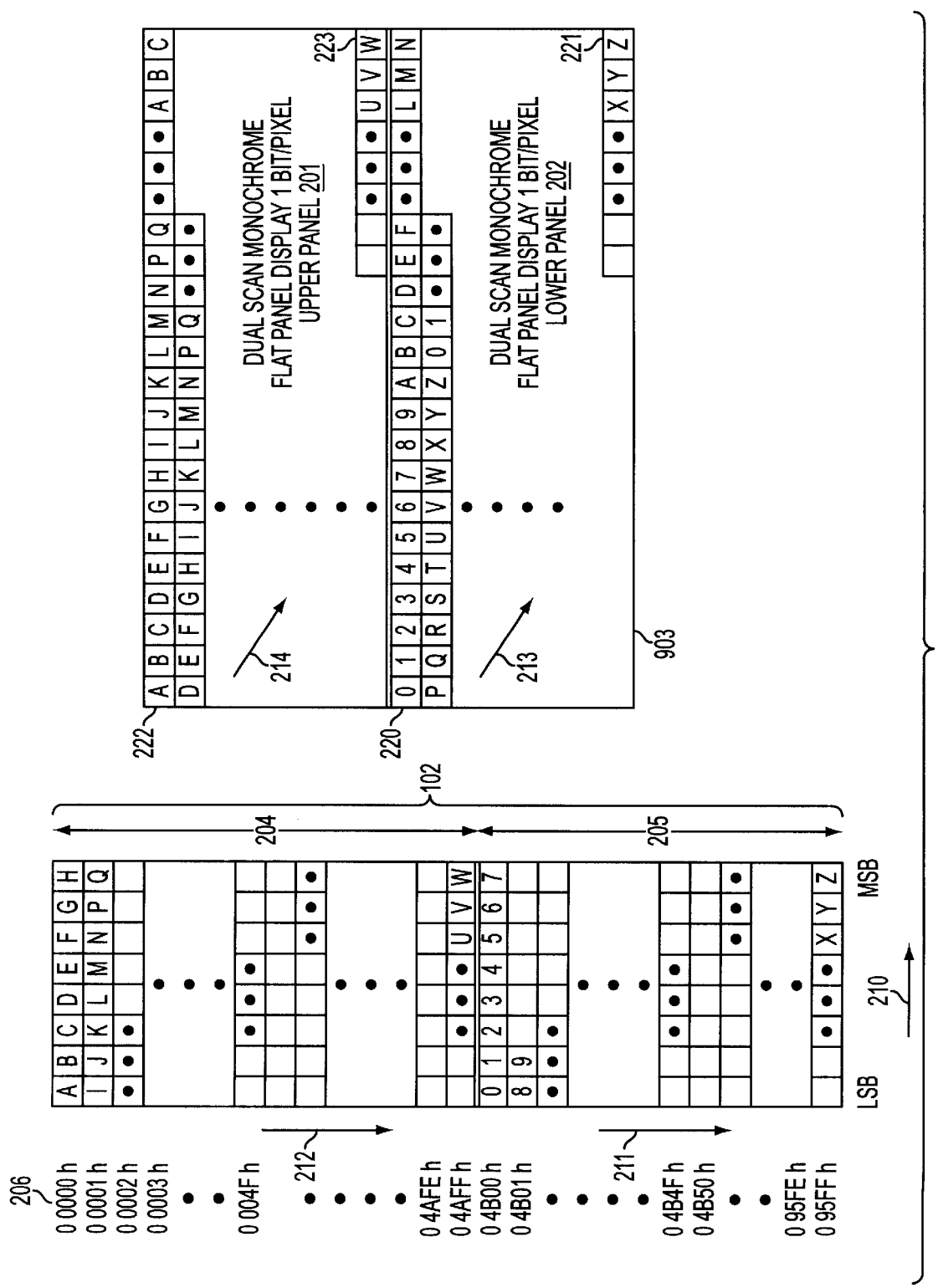
FIG. 2 is a diagram illustrating how bits within an even or odd full frame buffer are mapped onto pixel locations of a dual scan monochrome flat panel display.

Image rotation for a dual scan, single bit per pixel monochrome flat panel display may be accomplished in a slightly different manner. FIG. 2 illustrates a read operation for external video memory 907 of FIG. 9 containing full frame buffer 102 scanned onto flat panel display 903. Here, flat panel display 903 may be a dual scan, monochrome flat panel display using one bit per pixel.

Flat panel display 903 may be divided into top panel half 201 and bottom panel half 202. Panel pixel data for the two panel halves are located within the same full frame buffer 102 which may represent even full frame buffer 1104 or odd full frame buffer 1103. Addresses toggle between locations of panel pixel data for the upper half 204 and the lower half 205 of a full frame buffer 102.

For an unrotated image, panel pixel data bits from upper half 204 and lower half 205 of full frame buffer 102 are scanned out onto the upper panel half 201 and lower panel half 202 of dual scan flat panel display 903. Sequential read addresses are generated as illustrated by down arrows 212 and 211. Right arrow 210 illustrates the bit read sequence from LSB to MSB.

Pixel bit A, at address 0 0000 may be mapped from full frame buffer 102 onto upper-left corner 222 of upper panel half 201 as shown in FIG. 2. Pixel bit W, at address 0 4AFF of upper half 204 of full frame buffer 102 may be mapped into lower-right corner 223 of upper panel half 201. Pixel bit 0, at address 04B00 may be the first bit of lower half 205 of full frame buffer 102 and may be mapped into upper-left corner 220 of lower panel half 202 as shown. Pixel bit Z at address 0 95FF of lower half 205 of full frame buffer 102 may be mapped into lower-right corner 221 of lower panel half 202.

The scanning direction of upper panel half 201 and lower panel half 202 occurs from left to right on each scan line. As each scan line is completed the next lower scan line may be started from the left side of a panel half so the lines are scanned from the top to the bottom of each panel half. Arrows 214 and 213 represent the scanning direction on the panel.

Figure 6:
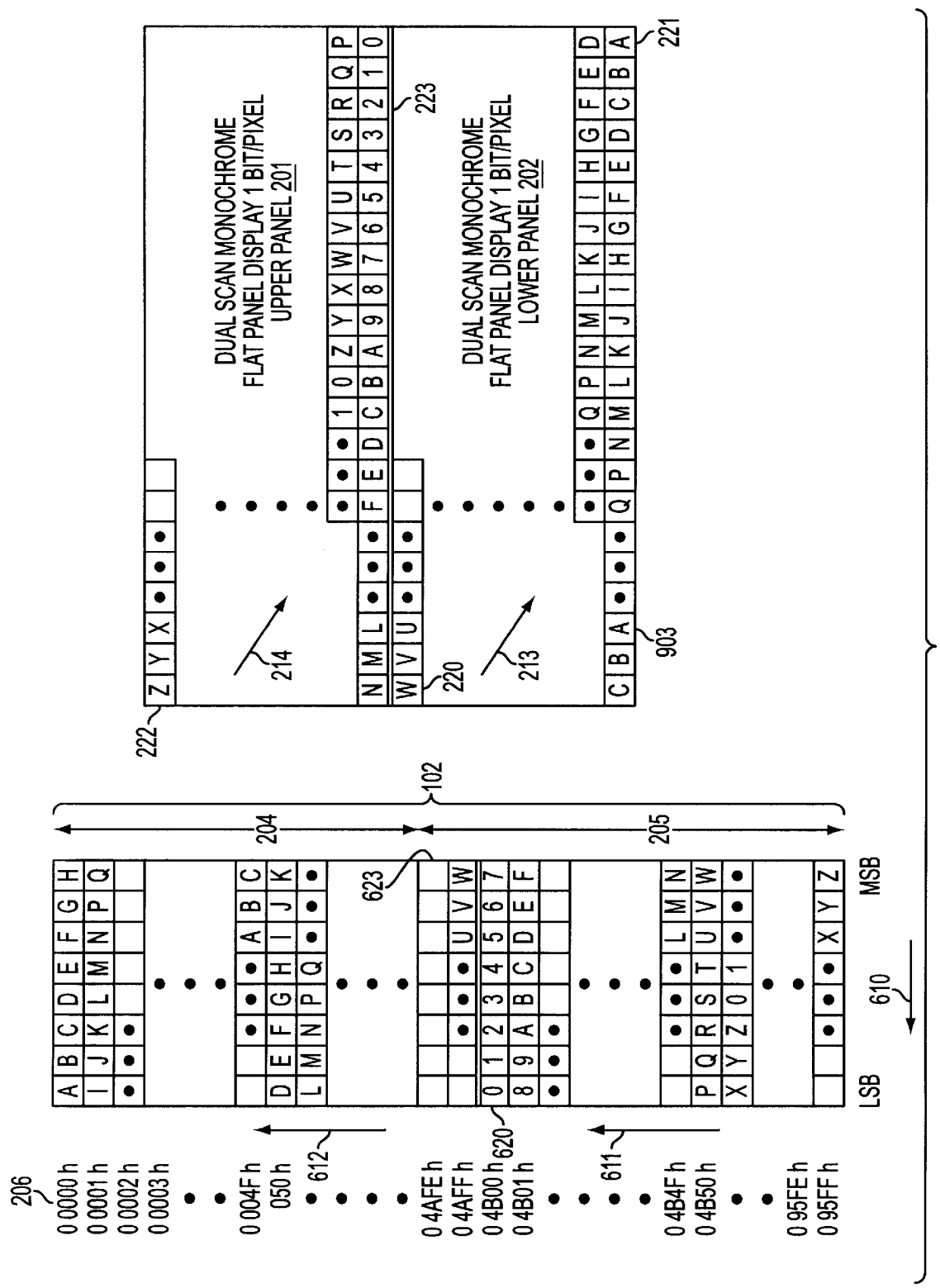
FIG. 6 is a diagram illustrating how bits, within an even or odd full frame buffer, are reverse mapped by the present invention onto pixel locations of a dual scan monochrome flat panel display.

FIG. 6 illustrates a read operation on dual scan monochrome panel 903 when selecting image rotation. Flat panel display 903 may be scanned in an identical manner as indicated by arrows 214 and 213. The contents of full frame buffer 102 are reverse scanned onto flat panel display 903 by reading full frame buffer 102 in a reverse order. In this case, upper panel half 201 of flat panel display 903 may be scanned from memory addresses 0 95FF to 0 4B00 hex as indicated by up arrow 611. Lower panel half 202 may be scanned from memory addresses 0 4AFF to 0 0000 hex as illustrated by up arrow 612. The data bit lines are sequentially read from the most significant bit (bit 7) to the least significant bit (bit 0) as represented by left arrow 610.

Pixel bit 0, at address 04B00, the first bit of lower half 205 of full frame buffer 102 may be mapped into lower-right corner 223 of upper panel half 201 as shown. Pixel bit Z at address 0 95FF of lower half 205 of full frame buffer 102 may be mapped into upper-left corner 222 of lower panel half 201. Pixel bit A, at address 0 0000 may be mapped from full frame buffer 102 onto lower-right corner 221 of lower panel half 202. Pixel bit W, at address 0 4AFF of upper half 204 of full frame buffer 102 may be mapped into upper-left corner 220 of lower panel half 202.

The position of the remapped pixels rotates the resultant image 180° as indicated on flat panel display 903 in FIG. 8B. The images in upper panel half 201 and lower panel half 202 of FIG. 2 are swapped and rotated 180°.

Color Dual Scan Flat Panel Display

In a color display, three bits per pixel may be used to drive the primary colors red, green, and blue. These three bits are sequentially stored in external video memory 907. The orientation of these three bits must be considered when selecting image rotation, such that rotated and unrotated images have the same color shading. The panel pixel data may be remapped to provide an rotated image while maintaining the proper color shading by driving the red, green, and blue subpixels in the same order at the remapped pixel location as they were originally driven.

Figure 3:
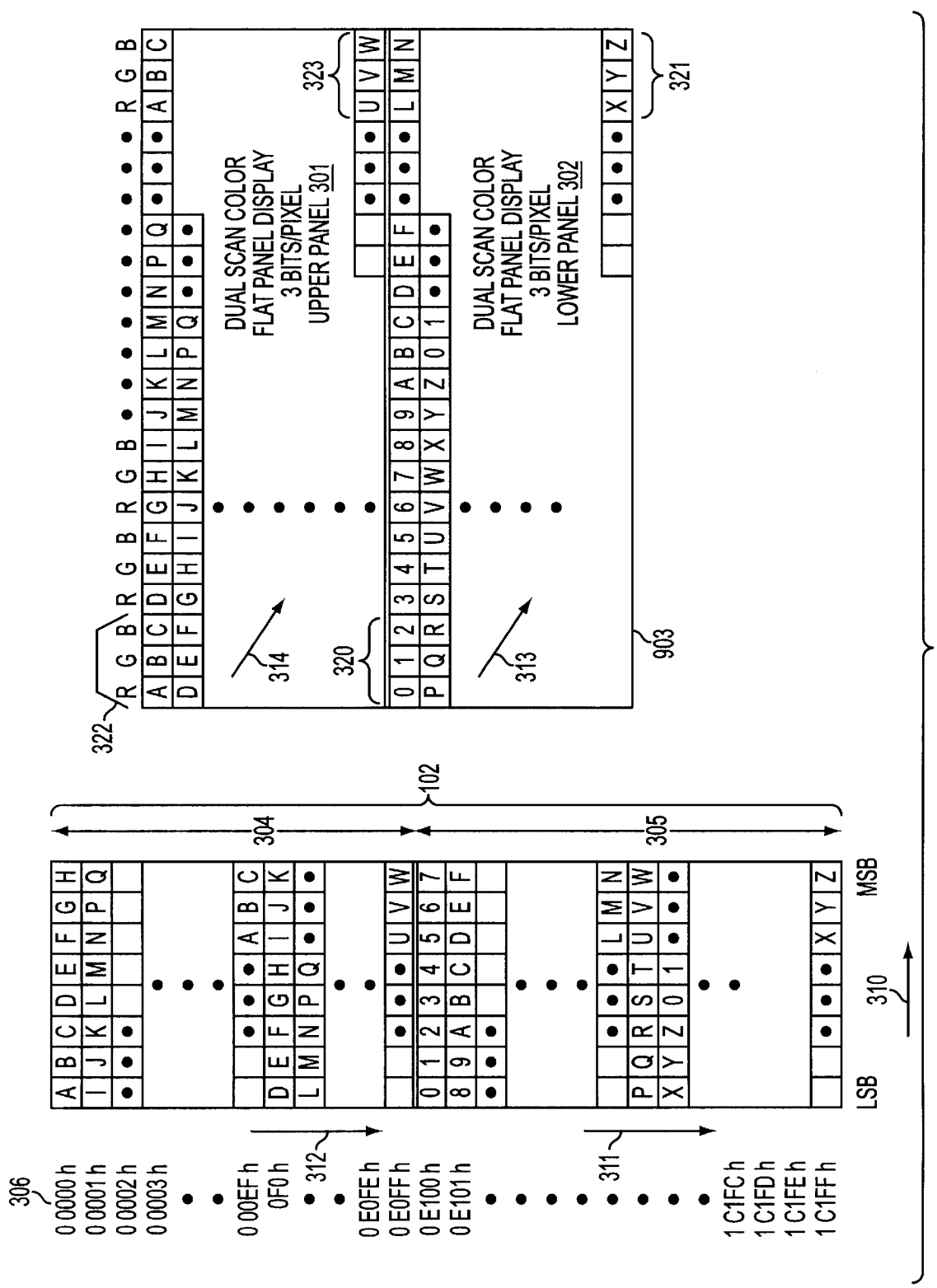
FIG. 3 is a diagram illustrating how bits within an even or odd full frame buffer are mapped onto pixel locations of a three bit per pixel color flat panel display.
Figure 4A:
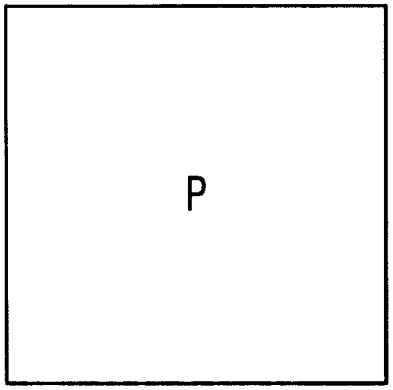
FIG. 4A is a diagram illustrating a monochrome pixel, consisting of one subpixel, represented by a single bit per pixel for a monochrome display.
Figure 4B:
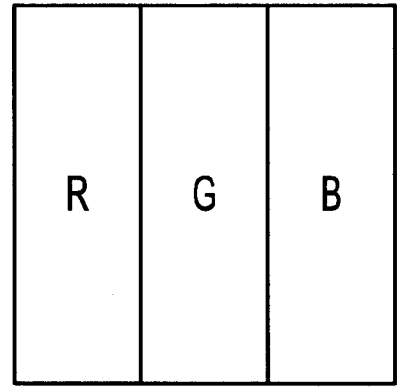
FIG. 4B is a diagram illustrating a color pixel, consisting of a total of three subpixels (red, green, and blue), represented by three bits per pixel for a color flat panel display.
Figure 4C:
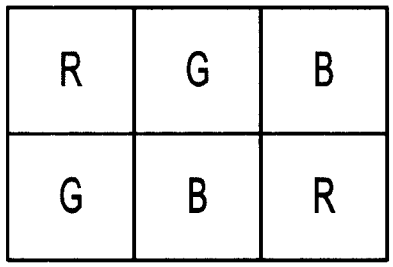
FIG. 4C is a diagram illustrating a color pixel, consisting of a total of six subpixels (two each of red, green, and blue), represented by six bits per pixel for a color flat panel display.
Figure 4D:
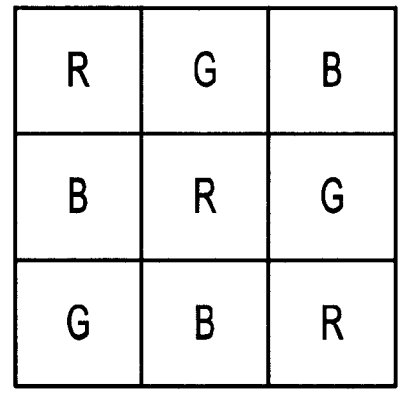
FIG. 4D is a diagram illustrating a color pixel, consisting of a total of nine subpixels (three each of red, green and blue), represented by nine bits per pixel for a color flat panel display.
Figure 7:
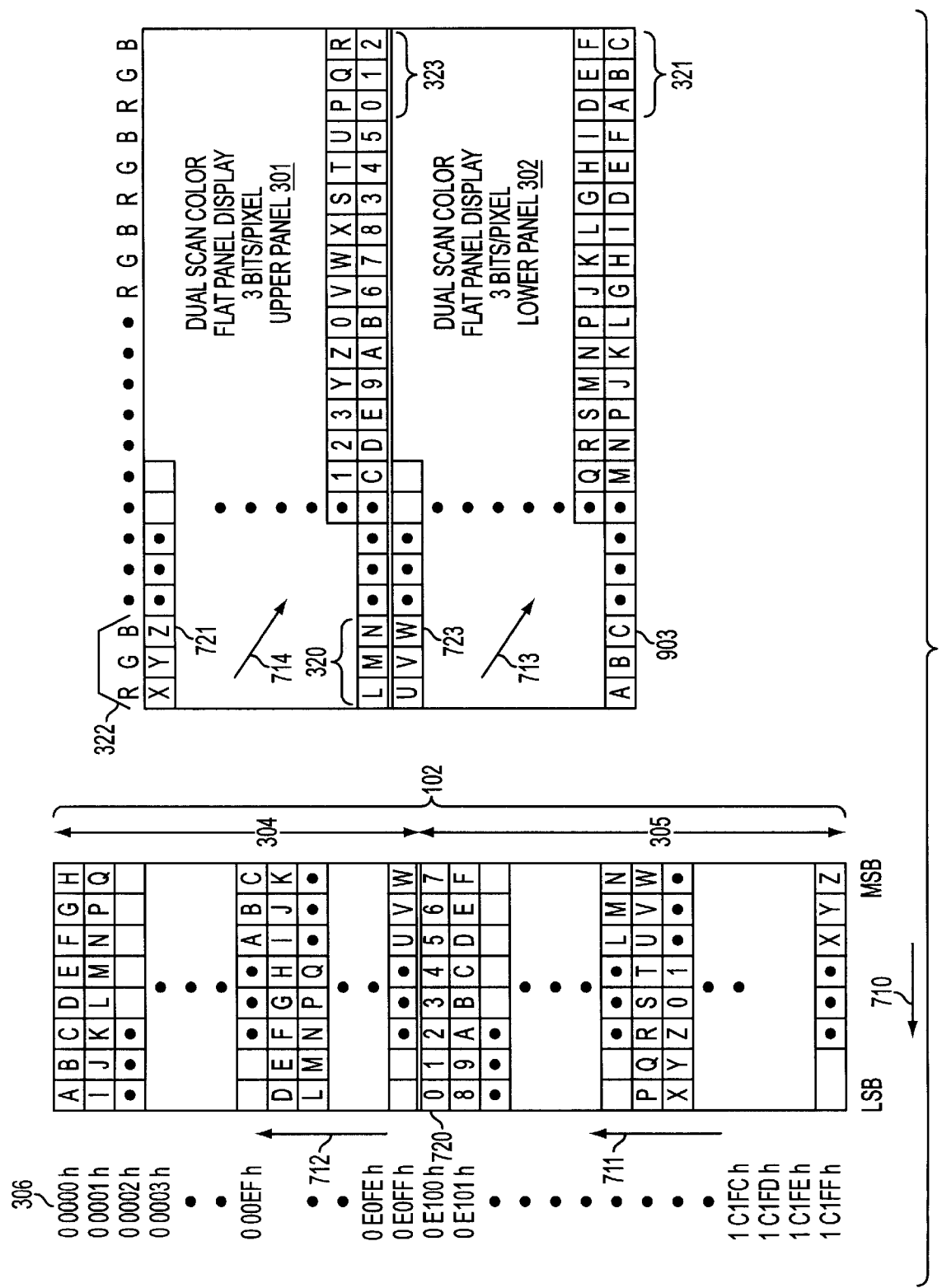
FIG. 7 is a diagram illustrating how bits, within an even or odd full frame buffer, are reverse mapped by the present invention onto pixel locations of a three bit per pixel color dual scan flat panel display.

FIGS. 3 and 7 show flat panel display 903 as a color flat panel display using three data bits per pixel. In color flat panel display 903 having three bits per pixel, pixel locations are remapped three bits at a time. If color flat panel display 903 uses 6 bits per pixel, the pixel locations are remapped 6 bits at a time. Similarly, if color flat panel display 903 uses N bits per pixel, the pixel locations may be remapped N bits at a time.

As color flat panel display 903 uses three bits per pixel, the size of full frame buffer 102 may be increased to accommodate increased data. Addresses range from 0 0000 hex to 1 C1FF hex for even full frame buffer 1104 or odd full frame buffer 1103 using external video memory 907 with an 8 bit data bus width. Note starting address 0 0000 hex is only suggestive, and starting addresses of even full frame buffer 1104 and odd full frame buffer 1103 may be modified.

FIG. 3 shows full frame buffer 102 read and panel pixel data scanned onto flat panel display 903 for an unrotated image. For dual scan color flat panel display 903, upper panel half 301 and lower panel half 302 are scanned concurrently. For example, subpixel bits A, B, C, D, E, and F may be scanned onto upper panel half 301 and then subpixel bits 0, 1, 2, 3, 4, and 5 scanned onto lower panel half 302, using a read address sequence from 0 0000 hex to 0 E0FF hex for upper panel half 301 and a read address sequence from 0 E100 hex to 1 C1FF hex for lower panel half 302. The addresses are sequentially incremented as illustrated by down arrows 312 and 311. In unrotated mode, the bits are read in a bit sequence from LSB to MSB as indicated by right arrow 310.

On the first scan line of upper panel half 301, subpixel bits A, B, and C represent upper left corner pixel location 322, where A may be a red subpixel bit, B may be a green subpixel bit and C may be a blue subpixel bit. This three bit grouping continues across the scan line and for each subsequent line. Since the subpixel locations on the panel do not change, the three bit sequence should be maintained in a proper order for each pixel when selecting image rotation.

FIG. 7 illustrates the reverse scanning when image rotation has been selected for three bit per pixel dual scan color flat panel display 903. The positions of the remapped pixel locations are somewhat different from monochrome dual scan flat panel display 903 of FIG. 6. Subpixel bits A, B, and C at address 0 0000 hex, previously mapped to upper left corner 322 of upper panel half 301 in FIG. 3, are now located in lower right corner 321 of lower panel half 302. However the sequence of the three subpixel bits A, B, and C remain in the same order on color flat panel display 903 as illustrated in FIGS. 3 and 7. The subpixel bits are shifted in groups of three such that the subpixel sequence and color shading of the pixel remain the same. If a six bits per pixel are used, then the subpixel bits may be shifted in groups of six to maintain the proper subpixel sequence when selecting image rotation.

As discussed with regard to monochrome dual scan flat panel displays, the overall read sequence of the pixels may be reversed. Addresses are read from 1 C1FF hex to 0 E100, scanning bits onto upper panel half 301. Addresses are read from 0 E0FF hex to 0 0000 hex, scanning bits onto lower panel half 302. The address sequence has been reversed from FIG. 3 as indicated by up arrows 711 and 712. Similarly, the bit sequence has been reversed as indicated by left arrow 710 with the exception of the three subpixel bit groupings.

Even and Odd Full Frame Buffers

FIG. 11B illustrates starting read addresses for even full frame buffer 1104 and odd full frame buffer 1103 to scan unrotated images. FIG. 11D illustrates starting read addresses for upper half 1108 and lower half 1110 of even full frame buffer 1104 as well as upper half 1107 and lower half 1109 of odd full frame buffer 1103 when selecting image rotation. Since image rotation has been selected, upper halves 1108 and 1107 of even and odd frame buffers 1104 and 1103 correspond to an image displayed on a lower panel half. Lower halves 1110 and 1109 of even and odd full frame buffers 1104 and 1103 correspond to an image displayed on an upper panel half.

Figure 12:
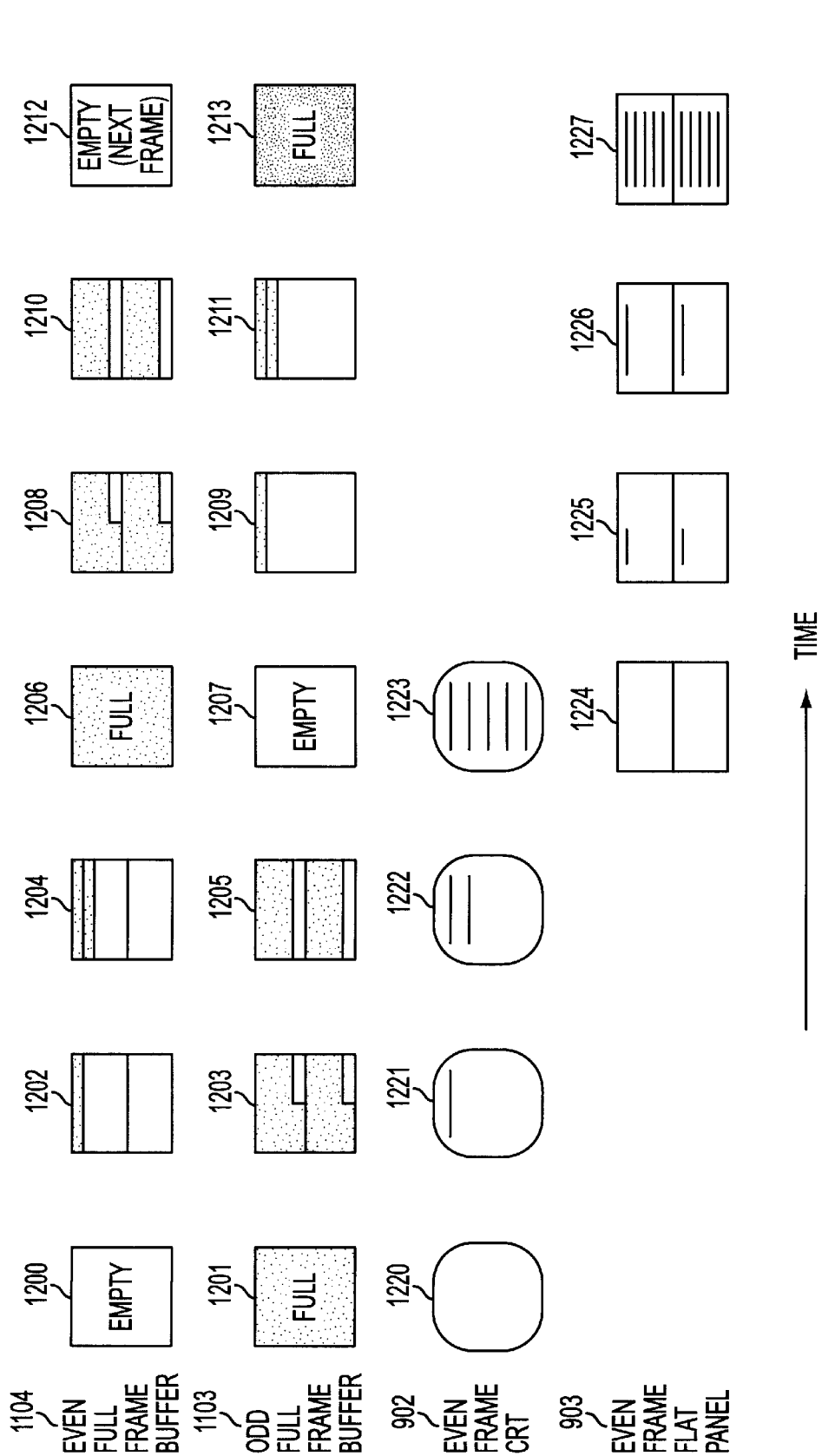
FIG. 12 is a diagram illustrating interaction between even and odd full frame buffers for a monochrome dual scan flat panel display.

FIG. 12 illustrates the progression of read and write operations for even full frame buffer 1104 and odd full frame buffer 1103. In this illustration, flat panel display 903 of FIG. 9 may be a dual scan flat panel display. An even frame for CRT 902 may be scanned onto CRT 902 as represented by steps 1220–1223. The time lag between a frame image scanned onto CRT 902 and the frame image scanned onto dual scan flat panel display 903 is represented by steps 1224–1227. Steps 1200–1213 represent the status of even full frame buffer 1104 and odd full frame buffer 1103. As discussed below, pixel data scanned onto CRT 902 may be concurrently converted into flat panel pixel data and stored into either even full frame buffer 1104 or odd full frame buffer 1103, while the other of the two frame buffers may be read out and scanned onto flat panel display 903. Each of these series of steps are arranged in FIG. 12 such that each column of steps occurs concurrently.

Arbitrator 1023 within the controller 901 for external video memory 907 arbitrates between read/write access into CRT VMEM space (not shown) and panel VMEM space (even frame buffer 1104 or odd frame buffer 1103) while scanning out data to each display. Panel read/write address logic 1008 generates appropriate read or write addresses for upper and lower halves of even full frame buffer 1104 and odd full frame buffer 1103.

Step 1220 illustrates the start of an even frame for CRT 902. The previous odd frame of pixel data for CRT 902 may be stored in odd full frame buffer 1103 as shown in step 1201 while even full frame buffer 1104 at step 1200 may be empty. Even full frame buffer 1104 may be written as shown in step 1202 as an even frame for CRT 902 may be scanned as shown in step 1221. At the same time, odd full frame buffer 1103 may be reverse scanned as shown in step 1203 onto flat panel display 903 (not illustrated). Note a complete line of panel pixel data may be written into even full frame buffer 1104 at step 1202, while two half scan lines of panel pixel data are read out from upper and lower half of odd full frame buffer 1103 at step 1203.

In step 1222, two complete lines of pixel data have been scanned onto CRT 902 and written as panel pixel data into even full frame buffer 1104 at step 1204. At the same time, one line of panel pixel data from both upper and lower halves of odd full frame buffer 1103 have been read and scanned onto the upper and lower panel half in step 1205.

A complete even frame of pixel data may be scanned onto CRT 902 in step 1223 and stored as flat panel pixel data in even full frame buffer 1104 at step 1206. Odd full frame buffer 1103 has been completely read out as shown in step 1207. Note the flat panel display image lags the CRT image by one frame time.

In step 1208 one half of a line may be reverse scanned from both upper and lower halves of even full frame buffer into upper and lower halves of flat panel display 903 as shown in step 1225. At the same time, panel pixel data generated from one line of odd frame pixel data for CRT 902 may be written into odd full frame buffer 1103 as shown in step 1209.

In step 1210, even full frame buffer 1104 has one line from each of the upper and lower halves scanned onto lower and upper panel halves of flat panel display 903 as shown in step 1226. One additional line of an odd frame for CRT 902 may be converted into panel pixel data and written into the odd full frame buffer 1103 as shown in step 1211.

Step 1227 illustrates the completion of scanning an even panel frame onto flat panel display 903. A complete even full frame buffer 1104 has been scanned onto flat panel display 903 as shown in step 1227 and may be converted to an empty frame as shown in step 1212 such that pixel data representing a next frame may be stored. Pixel data for an odd frame for CRT 902 has been completely converted into panel pixel data and stored into odd full frame buffer 1103 as shown in step 1213.

Hardware Operation

Figure 10A:
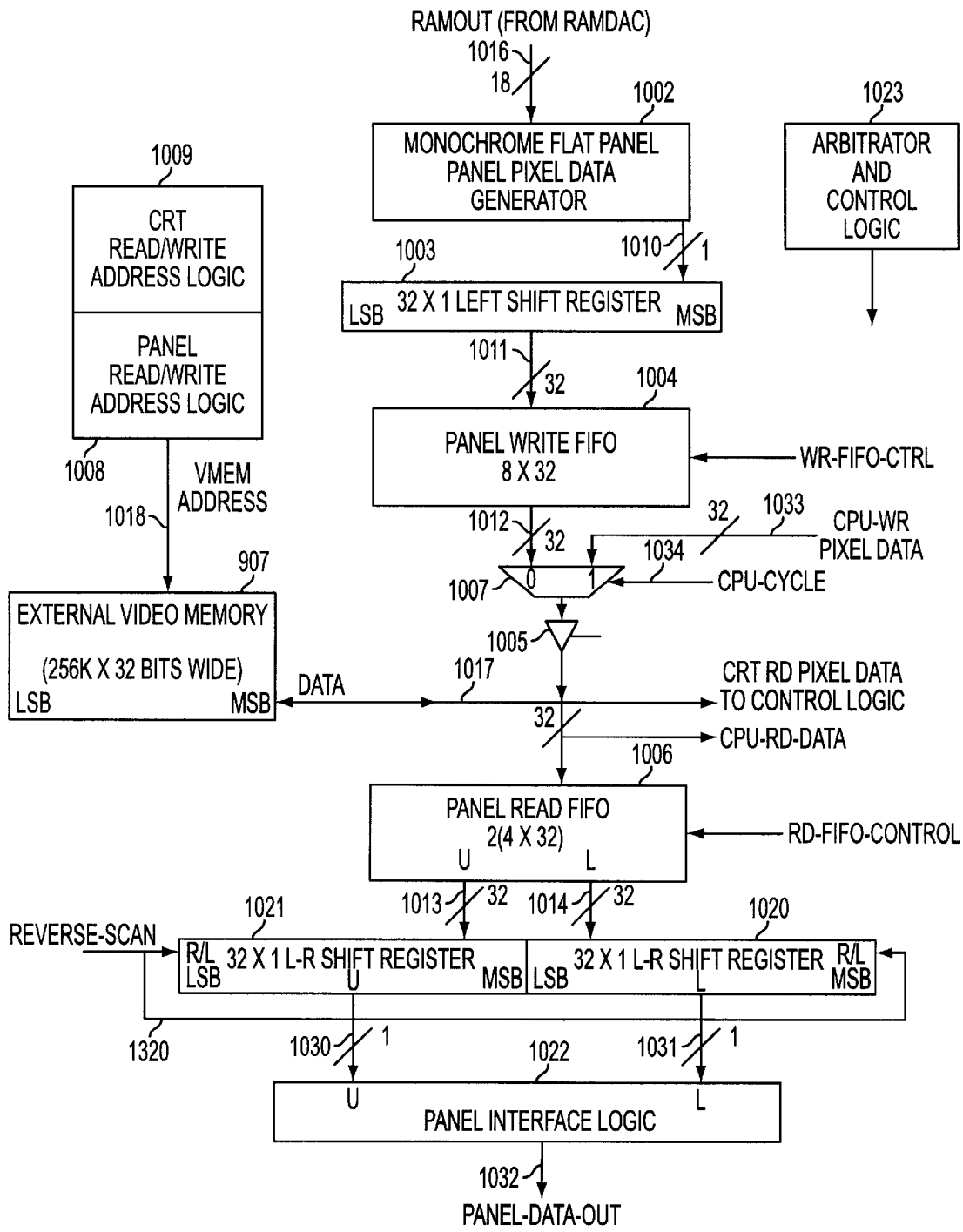
FIG. 10A is a flowchart illustrating a panel pixel data path for a dual scan monochrome panel which generates panel pixel data stored in an even or odd full frame buffer.
Figure 10B:
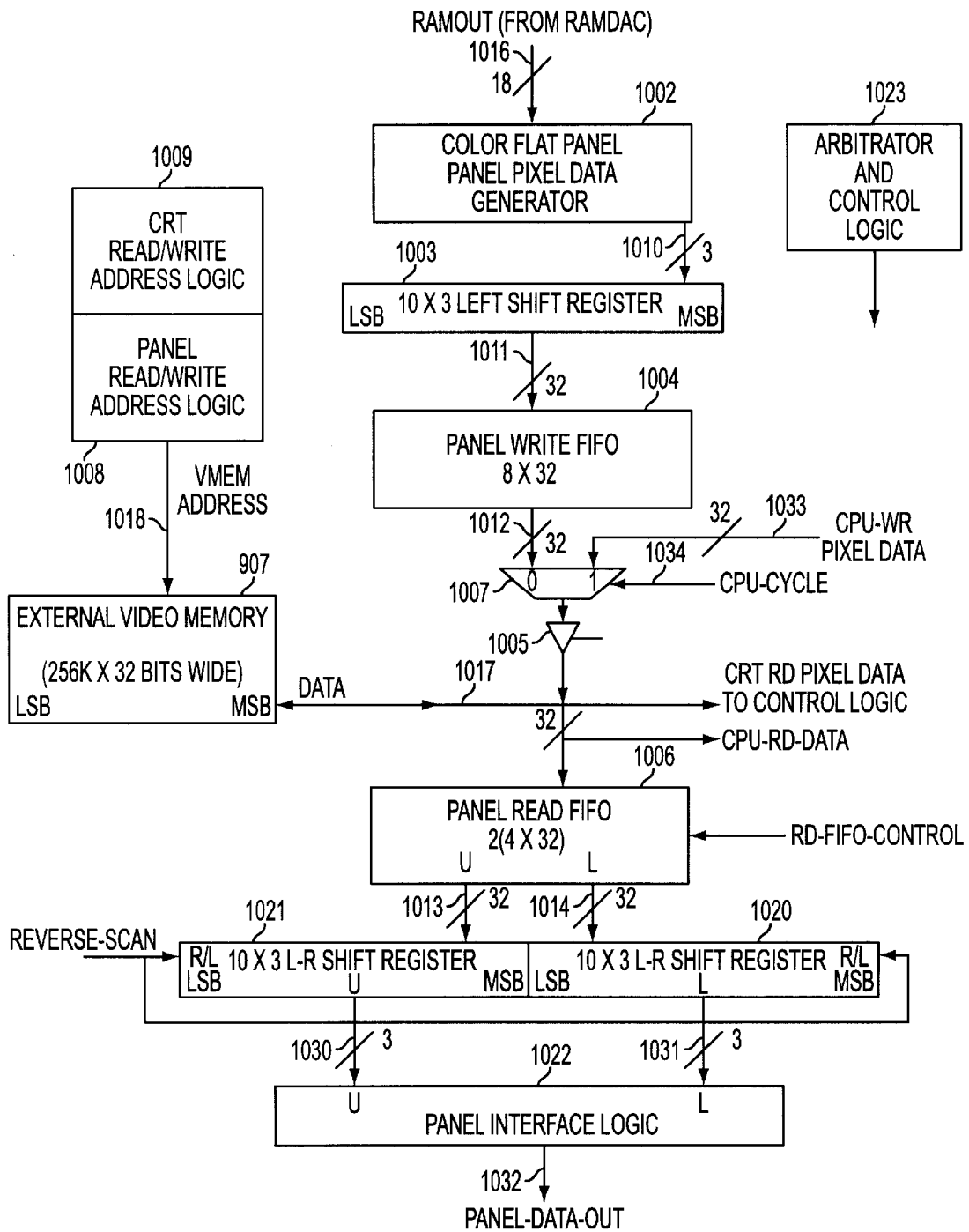
FIG. 10B is a flowchart illustrating a panel pixel data path three bit per pixel dual scan color panel which generates panel pixel data stored in an even or odd full frame buffer.

FIGS. 10A and 10B illustrate block diagrams of the path of panel pixel data into and out of external video memory 907. For the sake of illustration, some control signals associated with the hardware blocks in FIGS. 10A and 10B may not be shown. Although external video memory 907 is shown as external to video display controller 901, it may be integrated into video display controller 901 without departing from the spirit or scope of the invention. Even full frame buffer 1104 and odd full frame buffer 1103 may reside within external video memory 907.

Figure 14:
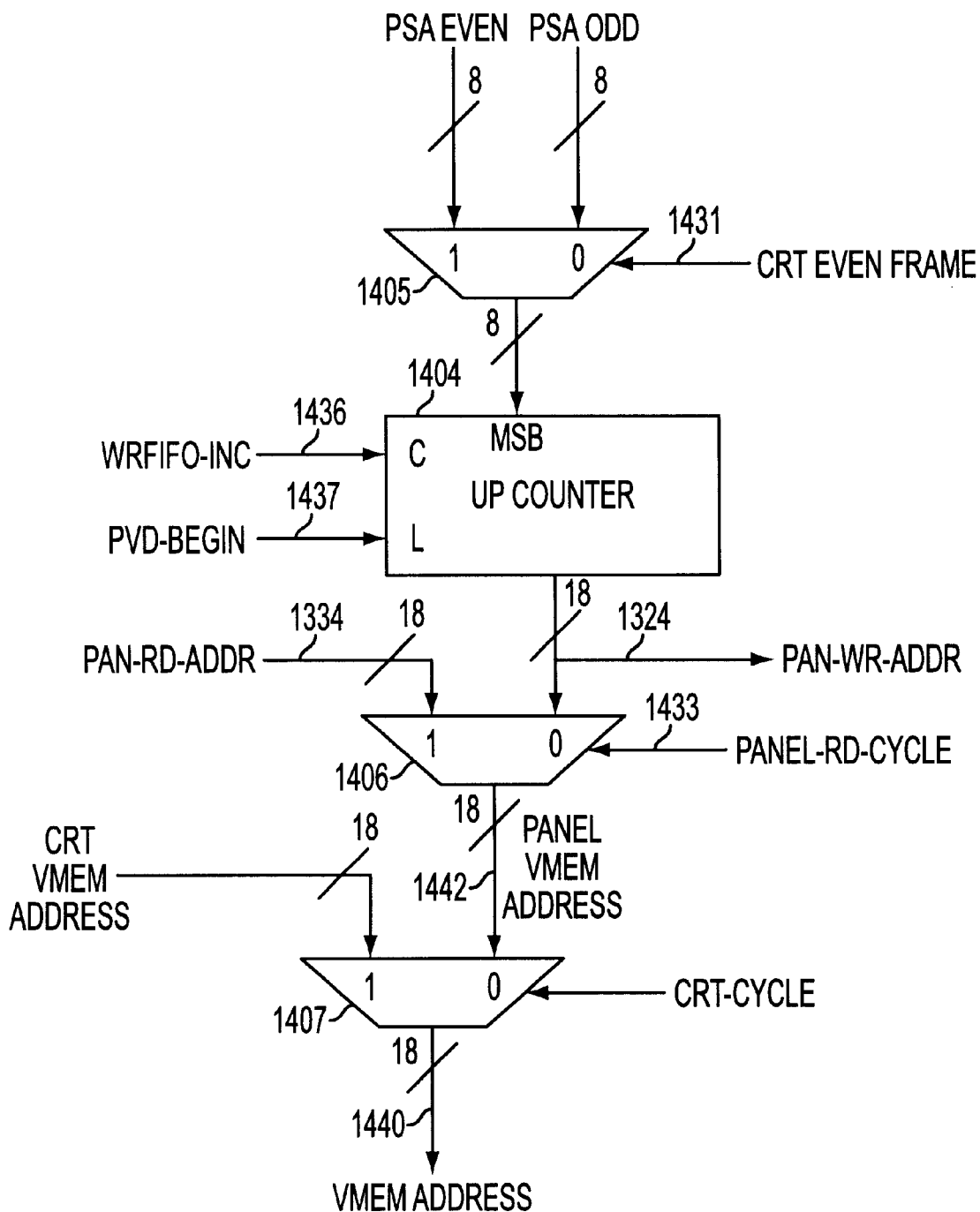
FIG. 14 is a block diagram of panel write address logic of FIGS. 10A and 10B.

FIG. 14 illustrates a block diagram of panel write address logic generating an 18 bit address for the even full frame buffer 1104 and odd full frame buffer 1103 during a write cycle to external video memory 907 (hereinafter "panel write cycle"). The panel write address may be used to store panel pixel data bits, converted from CRT pixel data, into full frame buffers as a frame may be scanned onto CRT 902.

Figure 13:
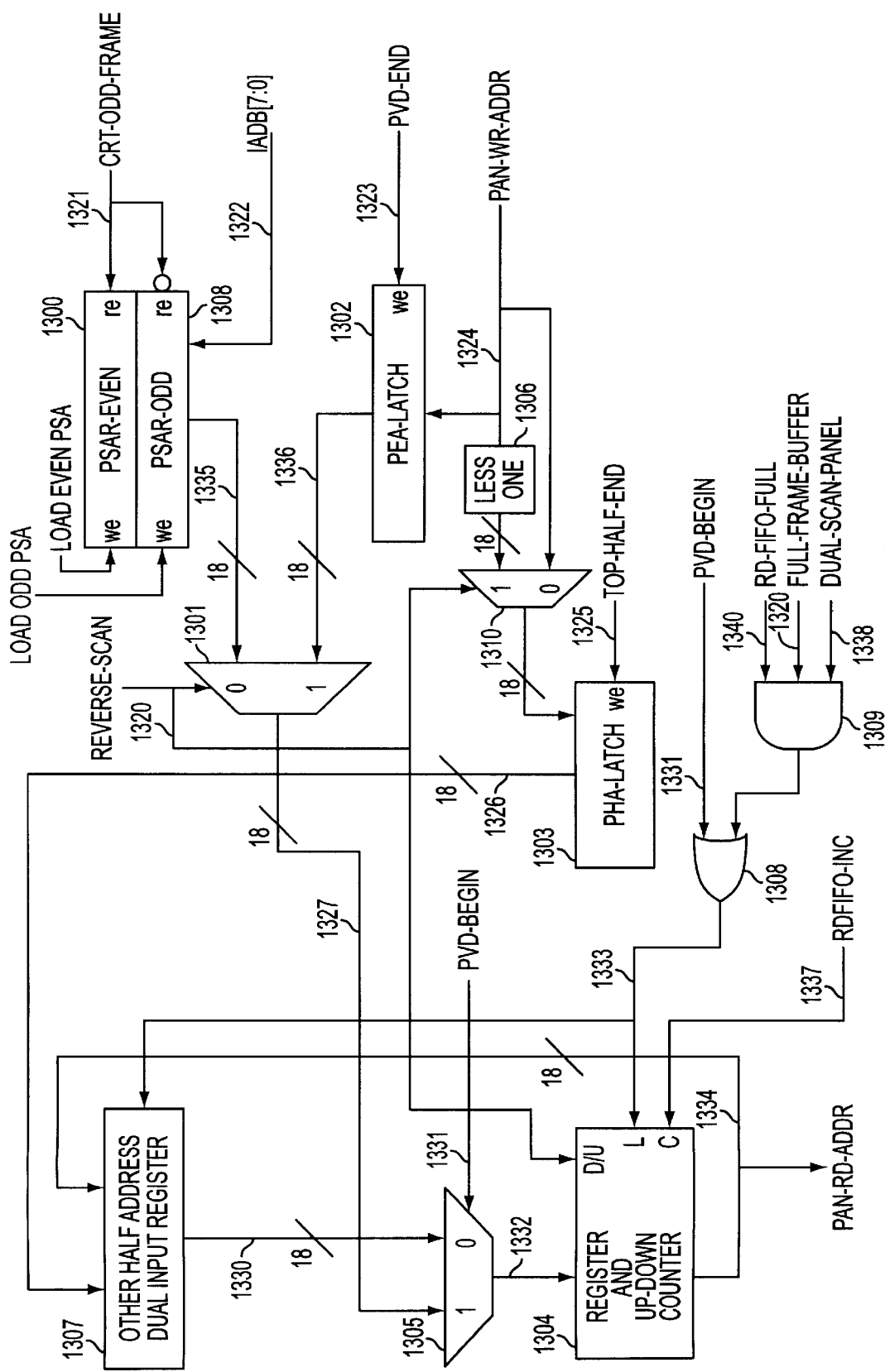
FIG. 13 is a block diagram of panel read address logic of FIGS. 10A and 10B.

FIG. 13 illustrates a block diagram of panel read address logic 1008 of FIG. 10A which generates an 18 bit address for the even full frame buffer 1104 and odd full frame buffer 1103 during a read cycle to external video memory 907 (hereinafter "panel read cycle"). Read addresses are generated to read and scan the panel pixel data bits onto flat panel display 903.

Arbitrator 1023 controls the sequence of CRT pixel data read/writes as well as panel pixel data read/writes into external video memory 907. It also controls the host CPU access into external video memory 907. Arbitrator 1023 prioritizes these cycles in the following order from high to low: CRT read/write cycle, external video memory read cycle, external video memory write cycle and CPU cycle, respectively. For example, if panel write FIFO 1004 is full, a panel write cycle request may be sent to arbitrator 1023. Arbitrator 1023 finishes the current cycle it is performing, and starts servicing the panel write request. Note that panel read cycles occur prior to panel write cycles. This assures data is completely read from full frame buffer before it is overwritten by a panel write cycle, for example at a frame boundary where even full frame buffer 1104 and, odd full frame buffer 1103 swap read/write operations.

Even full frame buffer 1104 or odd full frame buffer 1103 are completely read before any data is written into them by a next frame of data. If horizontal scan rates of CRT 902 and flat panel display 903 are different, generation of panel pixel data from CRT pixel data may be faster than reading and scanning data onto flat panel display 903. Switching between non-rotation and image rotation across frame boundaries, a previous unrotated frame image may be disturbed as the last few lines are scanned onto flat panel display 903. Arbitrator 1023, in conjunction with panel read FIFO 1006 and panel write FIFO 1004 assure the complete frame may be read and properly scanned onto flat panel display 903.

During a panel write cycle, panel pixel data may be written into even full frame buffer 1104 or odd full frame buffer 1103 within external video memory 907. During a panel read cycle, panel pixel data may be read from odd full frame buffer 1103 or even full frame buffer 1004 within external video memory 907 and scanned out onto flat panel display 903.

There are two FIFO (first in first out) buffers for panel pixel data, panel read FIFO 1006, and panel write FIFO 1004. Each FIFO assists in matching the data flow rates of panel pixel data between the read and write cycles into external video memory 907. Panel pixel data generated by the current CRT frame may be accumulated in panel write FIFO 1004 while panel pixel data within external video memory 907 may be read into panel read FIFO 1006. Panel read FIFO 1006 accumulates panel pixel data in a parallel form loaded into upper and lower left-right shift registers 1021, 1020. Data may be converted into a continuous serial data stream so flat panel display 903 may display pixel data without any interruption. A panel read FIFO greater than four words deep may be selected to better match the panel response time.

Panel pixel data may be generated from digital CRT data. The digital CRT data (hereinafter "CRT pixel data") is data used to generate the analog pixel information scanned onto CRT 902. CRT pixel data may be converted into panel pixel data and then stored into even full frame buffer 1104 within external video memory 907. A R.AMDAC (random access memory digital to analog converter) may be used to convert digital CRT pixel data into analog RGB signals for CRT display 902. The output from the color palette RAM of the RAMDAC, RAMOUT 1016, represents CRT pixel data supplied to the digital to analog converter of the RAMDAC.

CRT pixel data width (bits per pixel) varies depending upon the type of CRT 902. For example, CRT pixel data for an EGA CRT uses two bits for each color red, green, and blue, or 6 bits to represent one pixel. CRT pixel data for a VGA CRT uses six bits for each color red, green, and blue, or 18 bits to represent one pixel. The present invention may support multiple CRT display types. For a VGA CRT display, the signal RAMOUT 1016 may be 18 bits (three colors×six bits) wide. For an EGA CRT display, the lower two bits of each color may be active. Thus, only six of the 18 bits of RAMOUT may be active for an EGA CRT and panel pixel data generator 1002 responds accordingly.

Pixel data generator 1002 converts RAMOUT 1016 into panel pixel data. FIG. 10A illustrates the panel pixel data path where flat panel display 903 may be a monochrome flat panel display. FIG. 10B illustrates the panel pixel data path where flat panel display 903 may be a color flat panel display. The data path mode may be selected by the user by inputting panel type into the video controller.

If electronic grey scaling is selected, panel pixel data generator 1002 may generates a stream of panel pixel data one bit wide from a six bit red color input. The stream of panel pixel data over a series of frames provides the appearance of grey shades to a human eye. For a color flat panel display, pixel data generator 1002 accepts six bits per color and generates a three bit wide (one bit per subpixel) stream of data for each pixel of flat panel display 903. For EGA, two bits per color are input and similarly converted into a three bit wide stream of bits for each pixel of flat panel display.

The single stream of bits for each pixel may be referred to as panel input 1010. For a three subpixel per pixel color flat panel display, panel input 1010 may be three bits wide as illustrated in FIG. 10B. For a monochrome panel, a single subpixel per pixel monochrome panel, panel input 1010 may be one bit wide as illustrated in FIG. 10A. Grayscale and color shades may be generated as described in Bassetti, Jr. et al., U.S. Pat. No. 5,185,602, issued Feb. 9, 1993 and incorporated herein by reference.

Panel input 1010 may be a serial bit stream. To store this serial stream into full frame buffer, a serial to parallel conversion may be used. For a monochrome flat panel display 903, FIG. 10A, left shift register 1003 shifts one bit 32 times. For a color flat panel display 903, FIG. 10B, left shift register 1003 may be configured to shift three bits ten times into 30 LSBs.

For a six bit per pixel color flat panel display 903 or a panel which performs panel gray scaling, left shift register 1003 may be modified to shift six bits five times into 30 LSBs. For three or six bits per pixel, the two MSBs of a thirty two bit word are unused. The two unused bits reduce the efficiency of external video memory 907, requiring approximately 6.67% of additional external video memory 907 to support color.

Once left shift register 1003 has completed a shift cycle of 32, 10, or 5 bits, panel pixel data within left shift register 1003 may be loaded into panel write FIFO 1004. When panel write FIFO 1004 is nearly full, arbitrator 1023 writes panel pixel data from panel write FIFO 1004 into even full frame buffer 1004 or odd full frame buffer 1103.

After the data from panel write FIFO 1004 is stored into external video memory 907, a panel read cycle commences.

Panel read address logic 1008, discussed below, generates the appropriate upper and lower panel half addresses for external video memory 907 to read panel pixel data from odd full frame buffer 1003 or even full frame buffer 1104. If image rotation is selected, panel read address logic 1008 generates the reverse read sequence of panel addresses for external video memory 907.

Panel pixel data may be read out from external video memory 907 as a 32 bit word into the upper or lower portions of panel read FIFO 1006. For a dual scan flat panel display, panel read FIFO 1006 may be 32 bits wide to support four upper and four lower FIFO locations. The upper and lower FIFO locations correspond to upper and lower panel halves of a dual scan flat panel display. For a single scan flat panel display, panel read FIFO 1006 may be configured to store a 32 bit wide word into eight locations. It may be not necessary to consecutively scan pixels onto the upper and lower halves of flat panel display 903.

Next, arbitrator 1023 loads one upper panel half read FIFO location into upper panel half shift register 1021 and one lower panel half read FIFO location into lower panel half shift register 1020. For a monochrome panel, FIG. 10A, upper and lower panel half left-right shift registers 1021 and 1020 shift a 32 bit word out one bit at a time. For a three bit per pixel color flat panel display 903, FIG. 10B, the upper and lower panel half left-right shift registers 1021 and 1020 shift three 10 bit words three bits at a time to output three bits (RGB) each into panel interface logic 1022.

Figure 16A:
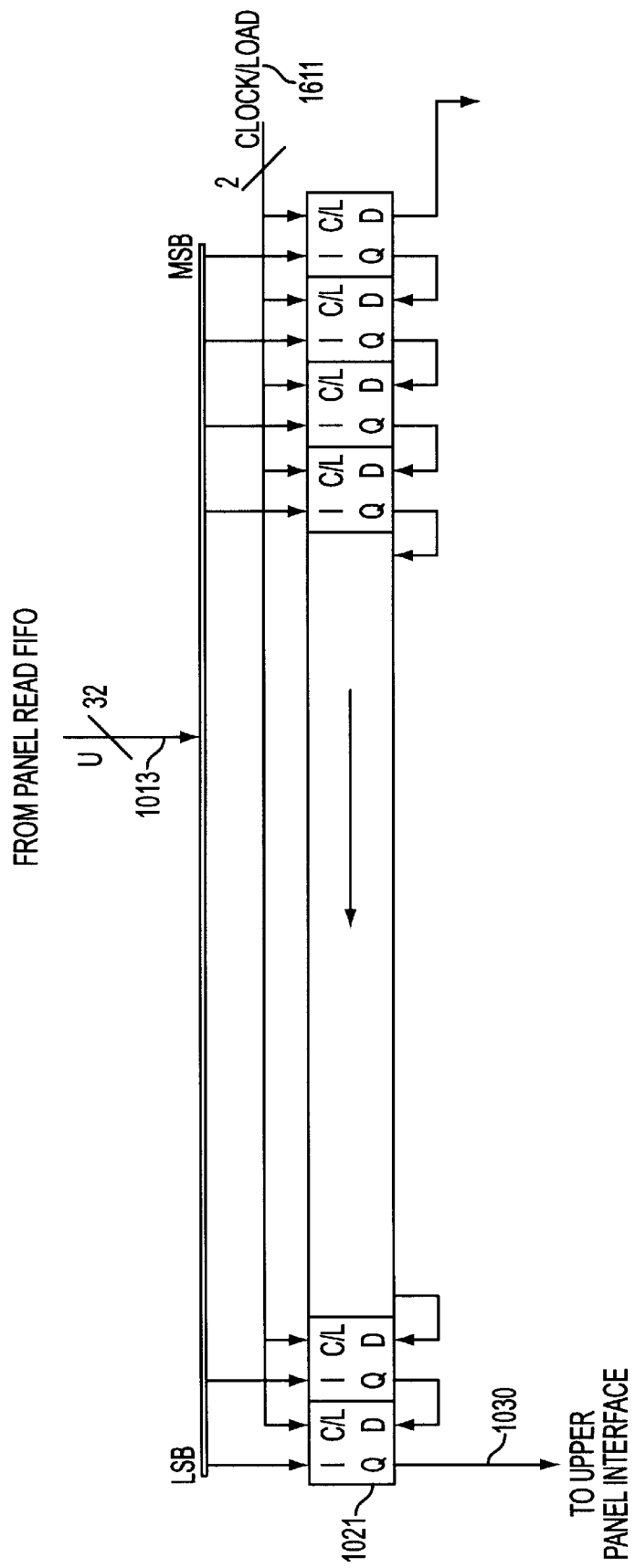
FIG. 16A is a diagram illustrating an upper left-right shift register converting parallel data into serial data for a monochrome flat panel display.
Figure 16B:
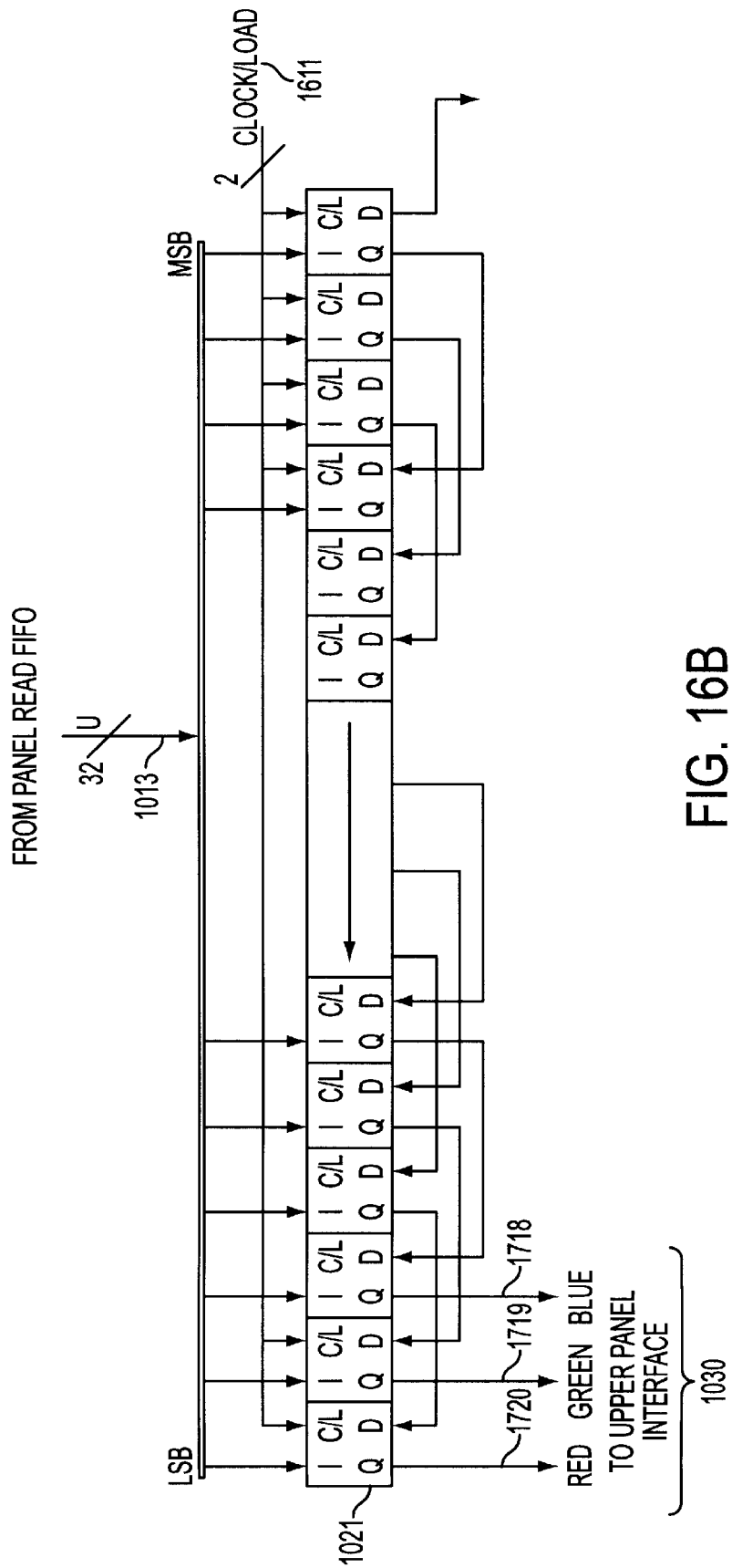
FIG. 16B is a diagram illustrating an upper left-right shift register converting parallel data into serial data for on a three bit per pixel color flat panel display.
Figure 17A:
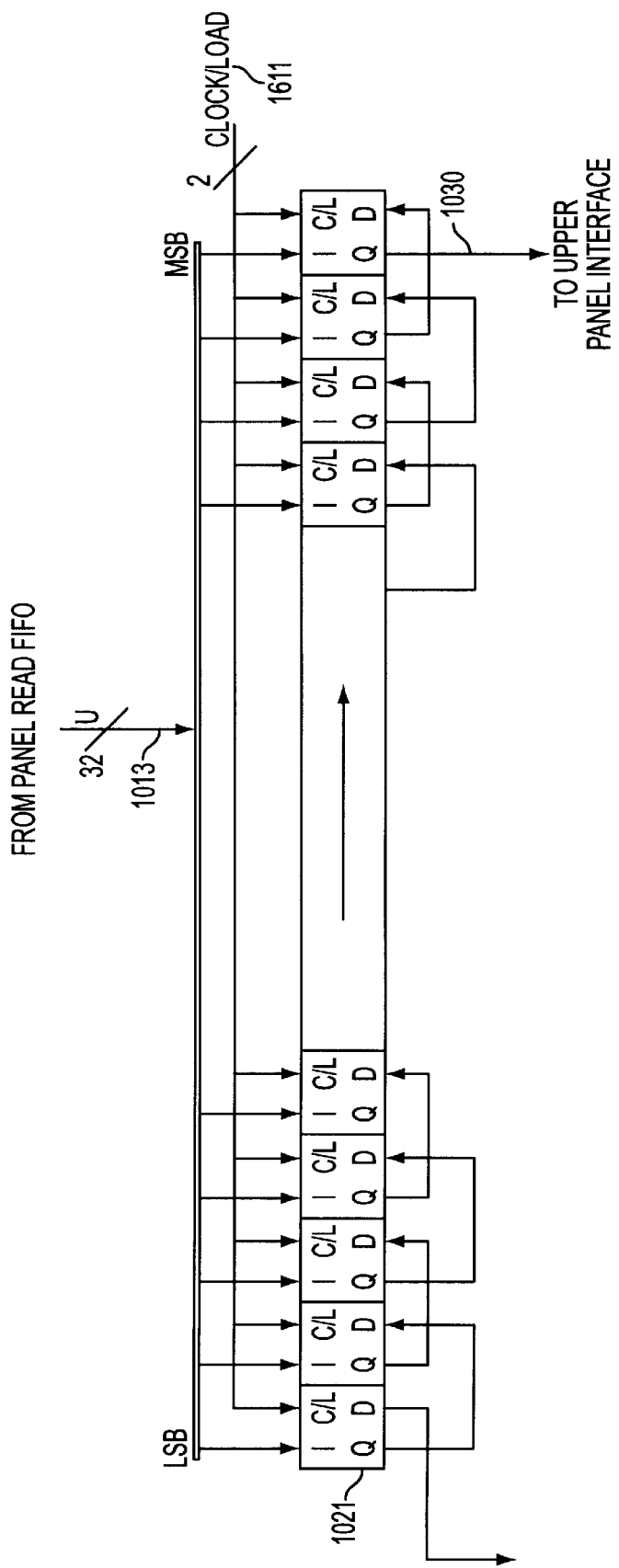
FIG. 17A is a diagram illustrating an upper left-right shift register converting parallel data into serial data to display a rotated image on a monochrome flat panel display.
Figure 17B:
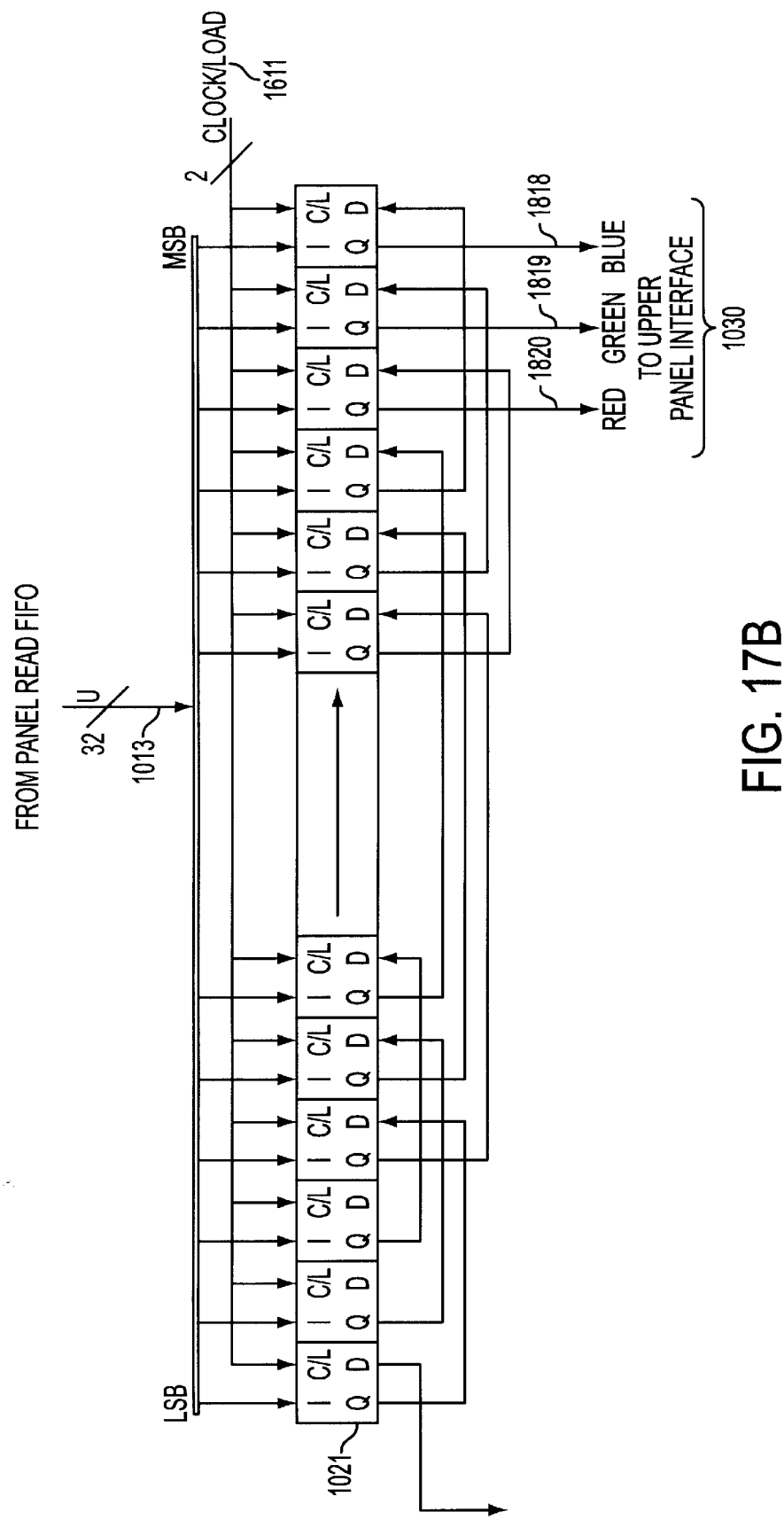
FIG. 17B is a diagram illustrating an upper left-right shift register converting parallel data into serial data to display a rotated image on a three bit per pixel color flat panel display.

Upper and lower panel half left-right registers 1021 and 1020 perform either bit sequencing or if image rotation is selected, reverse bit sequencing. For a non-rotation bit sequence, upper and lower panel half left-right shift registers 1021 and 1020 shift left such that the LSB may be output first and the MSB last as illustrated in FIGS. 16A and 16B. For a reverse bit sequence, upper and lower panel half left-right registers 1021 and 1020 shift right such that the MSB may be output first and the LSB last as illustrated in FIGS. 17A and 17B.

As discussed above, image rotation shifts three bits used for a color flat panel display 903. FIGS. 16B and 17B illustrate how the data format of three bits per pixel may be maintained by the left-right shift register. A six bit per pixel panel may be similarly handled by left-right shift registers 1020 and 1021.

As an alternative, left-right shift registers 1021 and 1020 may be implemented using multiplexors and registers. Register outputs may be multiplexed onto a common tristate data bus which may be one, three, six or more bits wide. The multiplexors may be selected such that data bits may be shifting left or right into a desired serial format, allowing greater flexibility in supporting various panel types having different numbers of bits per pixel.

Panel interface logic 1022 accepts upper half 1030 and lower half 1031 panel pixel data stream and converts the stream into an acceptable flat panel display output format, PANEL-DATA-OUT 1032. PANEL-DATA-OUT 1032 bus width varies from six, twelve or twenty-four bits to simultaneously present two, four or eight color pixels (e.g., three bits per pixel) to flat panel display 903. For a monochrome flat panel display, the width of PANEL-DATA-OUT 1032 bus width may be one bit or more. Panel interface logic 1022 receives as an input the type of flat panel display video display controller 902 will drive. Panel interface logic 1022 uses logic similar to a variable length shift register to convert or pack the panel pixel data into an acceptable format for flat panel display 903.

Figure 15:
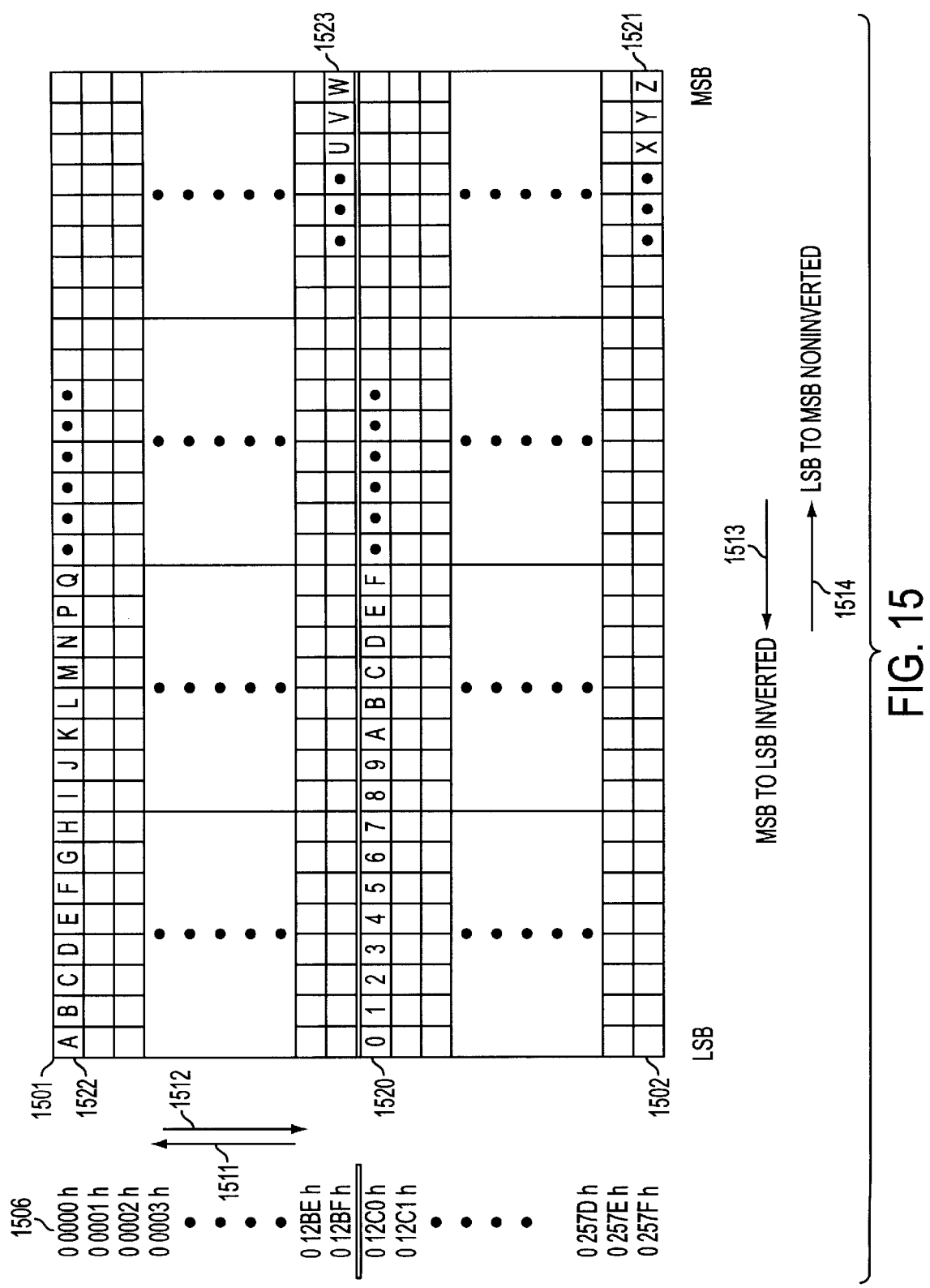
FIG. 15 is a diagram illustrating a 32 bit wide full frame buffer located within a 32 bit wide video memory.

The results of the above operations are illustrated by FIG. 15, FIG. 2, and FIG. 6. FIG. 15 illustrates one of even full frame buffer 1104 of odd full frame buffer 1103 within a 32 bit wide external video memory 907. For example, assume odd full frame buffer 1103 may be read such that panel pixel data stored therein may be scanned onto flat panel display 903. FIG. 2 illustrates panel pixel data, of odd full frame buffer 1103 of FIG. 15, scanned onto the dual scan flat panel display 903 in unrotated mode.

In unrotated mode, panel read address logic 1008 illustrated in FIG. 13 may generate a panel read address sequence from 0 0000 hex to 0 257F hex as indicated by down arrow 1512. Upper and lower panel half left-right registers 1021 and 1020 shift left, reading the bit sequence LSB first and MSB last. Right arrow 1514 in FIG. 15 indicates the bit sequence of the read operation.

FIG. 6 illustrates panel pixel data, within odd full frame buffer 1103 of FIG. 15, scanned onto dual scan flat panel display 903 when selecting image rotation. Panel read address logic 1008 illustrated in FIG. 13 may generate a panel read address sequence from 0 257F hex to 0 0000 hex as indicated by up arrow 1511. For image rotation, upper and lower panel half left-right registers 1021 and 1020 shift right, reading the bit sequence MSB first and the LSB last. Left arrow 1513 in FIG. 15 indicates the reverse bit sequence of the read operation.

In this manner, an image stored in odd full frame buffer 1103 may be reverse scanned onto flat panel display 903, displaying a rotated image. Comparing FIG. 2 and FIG. 6 again illustrates how the pixel locations are remapped for a dual scan flat panel display when selecting image rotation.

Color or multiple bits per pixel may add complexity to left and right shifting as the RGB subpixels of flat panel display are fixed in location. Thus the three bits of panel pixel data for color must remain in proper order. Otherwise, when selecting image rotation, colors of the rotated image may not match colors of the unrotated image. FIG. 16B illustrates the upper panel half left-right shift register modified to a three bit by ten shift configuration supporting a three bit per pixel color flat panel display 903. Left-right shift register 1021 shifts left in a unrotated mode reading the LSB first and the MSB last such that an unrotated image is displayed on flat panel display 903.

Thirty two bits of panel pixel data are loaded from panel read FIFO 1006 into shift register 1021 (input I of the individual register) when LOAD signal 1611 is asserted. Shift register 1021 shifts as CLOCK signal 1611 toggles. REVERSE-SCAN bit 1320 is input into left-right register 1020 and 1021 to determine the direction of the shift. If REVERSE-SCAN bit 1320 is high, left-right shift register 1020 and 1021 shift right. If REVERSE-SCAN bit 1320 is low, left-right shift registers 1020 and 1021 shift left.

FIG. 17B illustrates upper panel half left-right shift register 1021 for color flat panel display 903 shifting left when selecting image rotation. Shifting right when selecting image rotation, the MSB may be read first and the LSB last such that the bit sequence may be reversed and the displayed image on flat panel display 903 rotated. Three bit sequence 1720, 1719, 1718 in FIG. 16B may be kept in the same order as 1820, 1819, 1818 in FIG. 17B, whether or not image rotation is selected. Thus, the three bit output properly drives red, green, and blue subpixels for non-rotation as well as image rotation.

Starting Address for Full Frame Buffers

Referring to FIG. 13, the starting address for even full frame buffer 1104 (PSA-EVEN) may be set by the user in the even panel start address register (PSAR-EVEN) 1300. The starting address for odd full frame buffer 1103 (PSA-ODD) may be set by the user in the odd panel start address register (PSAR-ODD) 1308. PSAR-EVEN register 1300 and PSAR-ODD register 1308 are eight bit registers which specify the starting upper eight bits of eighteen bit panel read and write addresses PAN-RD-ADDR 1334 and PAN-WR-ADDR 1324.

For panel read logic, PSA-EVEN and PSA-ODD are generated by taking the contents of PSAR-EVEN and PSAR-ODD as the 8 MSBs and combining 10 zeroes as the 10 LSBs to generate a total of 18 bits. For panel write address logic, the upper 8 MSBs of PSA-EVEN and PSA-ODD are directly loaded into counter 1304 while the lower 10 are automatically set to zero at counter 1304. Incrementing either of PSAR-EVEN or PSAR-ODD by one moves the start address of either even full frame buffer 1104 or odd full frame buffer 1103 within external video memory 907 by 1024 words. In this manner the register allows the video BIOS to move the even full frame buffer 1104 and odd full frame buffer 1103 over a range of external video memory 907.

Control Signal Generation

Proper control timing may be generated for each of the various frames using information regarding the type of panel scanned. The type of panel and CRT are provided to two state machines; a panel row state machine (not shown) keeps track of the present scan line while a panel column state machine (not shown) keeps track of the present pixel location on flat panel display 903. In this manner, address locations of pixel data within external video memory 907 properly match locations on flat panel display 903. The two state machines further generate panel timing control signals such as PVD-BEGIN, PVD-END, and various shift register clocks to control the proper flow of panel pixel data into and out of external video memory 907. A nine-bit counter may assist the state machines by counting the number of columns of pixels by 4 (i.e., maximum count=512 counts×4=2048 pixels). Thus a load signal to store data from left shift register 1003 into panel write FIFO 1004 may be generated accordingly.

Once CRT 902 screen has been completely written, CRT-VD-END signal may be generated, starting panel row state machine counting the number of panel scan lines from zero. CRT-VD-END signal indicates the even/odd (or odd/even) CRT frame boundary has been crossed. Because panel write FIFO 1004 accumulates panel pixel data bits, panel row state machine may be counting ahead of panel pixel data bits stored into external video memory 907. All data accumulated in panel write FIFO 1004 may be written into external video memory 907 by waiting for panel write FIFO 1004 to empty (WR-FIFO-EMPTY) after TOP-HALF-END signal is generated.

After video controller 901 has completely scanned a first line onto CRT 902, a CRT horizontal display end signal CRT-HD-END may be generated, starting panel column state machine counting a number of columns. Due to pipeline delays within the RAM portion of the RAMDAC and color or grayscale pixel data generator 1002, panel column state machine may be loaded with a starting offset value.

A pulse PVD-BEGIN generated by panel column state machine indicates the start of a panel frame and generates read addresses for even full frame buffer and odd full frame buffer 1103. A pulse PVD-END is generated by panel column state machine indicating flat panel display 903 has been completely scanned. A pulse TOP-HALF-END is generated by panel column state machine when all scan lines of an upper half of a panel have been completely scanned onto a panel. Both upper and lower halves of dual scan flat panel display 903 are consecutively scanned. For dual scan flat panel display 903, TOP-HALF-END pulse may be generated moments before PVD-END pulse. TOP-HALF-END pulse indicates an upper panel half has been completely scanned, and PVD-END pulse indicates a lower panel half has been completely scanned. A single scan flat panel display may be scanned in a similar manner to a CRT where PVD-END pulse may be not generated until much later than TOP-HALF-END pulse, when a lower panel half of a single scan flat panel display has been completely scanned.

Reverse-Scan Bit

A REVERSE-SCAN bit 1320 indicates to panel control logic 901 whether or not image rotation is selected. A REVERSE-SCAN bit 1320 may be manually or automatically set. For an LCD projection panel projecting an image upside down it may be desirable to manually set REVERSE-SCAN bit 1320 by pushing a button or changing a software setting. In a pen-based LCD panel which may be flipped on a horizontal axis to dock to a base system to another person, REVERSE-SCAN bit 1320 may be automatically set. Further, circuits may be used to automatically sense the panel orientation by using gravity sensors or other sensing means. Thus, for example, when a user flips a panel vertically around a horizontal axis, REVERSE-SCAN bit 1320 may automatically set so another person may view a properly oriented panel image.

Panel Read and Write Cycles

There are three main sequences of operations on external video memory 907 when operating in conjunction with a dual scan flat panel display 903. External video memory 907 may be written to during a panel write cycle into even full frame buffer 1104 or odd full frame buffer 1103. During this write operation, panel pixel data representing a portion of a CRT frame may be stored into even full frame buffer 1104 or odd full frame buffer 1103. External video memory 907 may be read from during a panel read cycle into the upper half of odd full frame buffer 1103 or even full frame buffer 1104. During this read operation panel pixel data representing a portion of upper half of a previous CRT frame may be read from odd full frame buffer 1103 or even full frame buffer 1104. External video memory 907 may also be read from during a panel read cycle into the lower half of odd full frame buffer 1103 or even full frame buffer 1104. During this read operation panel pixel data representing a portion of a lower half of a previous CRT frame may be read from odd full frame buffer 1103 or even full frame buffer 1104.

The two read operations generate upper half and lower half panel read addresses. These three read/write operations are continuous until a full frame buffer is full. Once a full frame buffer is filled, even full frame buffer 1104 and odd full frame buffer 1103 swap read/write operations. Thus reading/writing of even full frame buffer 1104 alternates with the writing/reading of odd full frame buffer 1103 as each becomes full or empty.

Panel Write Address Logic

Referring now to FIG. 14, after a user has loaded PSAR-EVEN and PSAR-ODD registers, panel start address even PSA-EVEN and the panel start address odd PSA-ODD are available at the outputs of these registers. If an even frame is scanned onto CRT 902, panel pixel data may be written into even full frame buffer 1104, as illustrated by CRT 902 in steps 1220–1223 and even full frame buffer 1104 in steps 1200, 1202, 1204, and 1206 of FIG. 12.

At the beginning of an even frame, EVENFRAME signal 1431 may be set high selecting multiplexor 1405 to input PSA-EVEN address 1431 into upcounter 1404. PVD-BEGIN signal 1427 loads eight bits of PSA-EVEN into eight MSBs of eighteen bit upcounter 1404. To write into even full frame buffer 1104, arbitrator 1023 sets PANEL-RD-CYCLE signal 1433 low. Multiplexor 1406 selects panel write address PAN-WR-ADDR 1324 to panel VMEM address 1442. WRFIFO-INC 1436 increments upcounter 1404 by one. In this manner, as upcounter 1404 is incremented a maximum seven or eight times for a 32 bit wide external video memory 907, external video memory 907 may be addressed such that eight FIFO locations of panel write FIFO 1004 may be stored into even full frame buffer 1104.

For example, panel write addresses may be incremented over a range from 0 0000 hex to 0 0007 hex. Arbitrator 1023 may store fewer FIFO locations into external video memory 907 under certain circumstances, such as a receiving a panel read request from panel read FIFO 1006. PAN-WR-ADDR 1324 may be monitored by read address logic 1008 of FIG. 13. After completing a panel write cycle, writing eight used FIFO locations into even full frame buffer 1104, arbitrator 1023 performs a read cycle from external video memory 907, scanning a portion of odd full frame buffer 1103 onto dual scan flat panel display 903.

PAN-RD-CYCLE signal 1433 may be set high selecting PAN-RD-ADDR 1334 as PANEL VMEM ADDRESS 1442 output from multiplexor 1406. Panel read address logic 1008 generates a number of panel read addresses into odd full frame buffer 1103. After completing a VMEM read cycle, arbitrator 1023 may perform another write cycle to external video memory 907. The next address may start with 0 0008 hex and continue incrementing another seven times. These write cycles may continue until even full frame buffer 1104 is full. Once full, panel write address logic 1008 will write into odd full frame buffer 1103.

Panel read address logic 1008 then reads from even full frame buffer 1104. EVENFRAME signal 1431 may be set low indicating an odd CRT frame such that the PSA-ODD address 1430 may be input into upcounter 1404. PVD-BEGIN signal 1437 loads the eight bit PSA-ODD address 1430 into eight MSBs of eighteen bit upcounter 1404. PANEL-RD-CYCLE signal 1433 may be set low so PAN-WR-ADDR 1324 may be selected as the PANEL VMEM ADDRESS 1442. WRFIFO-INC signal 1436 increments upcounter 1404, increasing the panel write address by one. Upcounter 1404 continues to increment until the present panel write cycle is completed.

Panel Read Address Logic

FIG. 13 illustrates panel read address logic 1008 where even full frame buffer 1104 is written with an even CRT frame while odd full frame buffer 1103 containing an odd panel frame is read, corresponding to the illustrations in FIG. 12. Image rotation may be selected by REVERSE-SCAN bit 1320. REVERSE-SCAN bit 1320, as discussed above, may be manually selected or automatically generated by a sensor. REVERSE-SCAN bit 1320 may be low (zero) such that image rotation is not selected.

Upon initialization, eight MSBs of even panel start address PSA-EVEN and eight MSBs of odd panel start address PSA-ODD are loaded from internal address/data bus IADB[7:0] into panel start address register even PSAR-EVEN 1300 and panel start address register odd PSAR-ODD 1308. LOAD ODD PSA and LOAD EVEN PSA strobe eight MSBs of PSA-EVEN and PSA-ODD into panel start address registers 1300 and 1308. To complete the panel start addresses, ten LSBs, all zero, are combined with eight MSBs to become eighteen bit starting addresses, PSA-EVEN and PSA-ODD.

As an even CRT frame is scanned onto CRT 902 in step 1220, an odd panel frame may be read from odd full frame buffer 1103 and scanned out to flat panel display 903. Panel pixel data of an even panel frame may be stored into even full frame buffer 1104 in step 1200 as an even CRT frame is scanned onto CRT 902. However, recall there may be a one frame time lag from the frame displayed on flat panel display 903 to the frame displayed on CRT 902. Thus, when an even CRT frame is displayed on CRT 902, an odd panel may be displayed on flat panel display 903.

Once half of the pixel data has been generated and written into even full frame buffer 1104, TOP-HALF-END 1325 may be generated by the panel row state machine. TOP-HALF-END may be generated as panel pixel data stored into even full frame buffer 1104 or odd full frame buffer 1103 crosses from upper panel half to lower panel half corresponding to the crossing from upper half to lower half of even full frame buffer 1104 or odd full frame buffer 1103.

TOP-HALF-END pulse strobes PAN-WR-ADDR 1324 address of even full frame buffer 1104 into panel half address latch PHA-LATCH 1303. PAN-WR-ADDR 1324 points to an address location of lower half of even full frame buffer 1104 or odd full frame buffer 1003, representing the first 32 bits of panel pixel data will be scanned onto a lower half of flat panel display 903 during a subsequent frame. This address may be referred to as the panel half address and varies depending upon the type of flat panel display scanned.

For non-rotation, REVERSE-SCAN bit 1320 may be set low such that a panel half address passes through multiplexor 1310 into PHA-LATCH 1303. A panel half address may be strobed into PHA-LATCH 1303 by TOP-HALF-END pulse 1325. For a 640×480 pixel format, the address stored into PHA-LATCH 1303 represents the beginning of panel pixel data for scan line 240 (scan lines numbered from 0–479 rows), pixel number 0 (pixels numbered from 0–639 columns). The panel half address may be used to point to a lower half of dual scan flat panel display 903, read even full frame buffer 1104, and scan the contents of even full frame buffer 1104 and odd full frame buffer 1103 onto flat panel display 903.

If a lower half of an even CRT is scanned onto CRT 902, a lower half of an even panel frame continues to be written into even full frame buffer 1104. Once the last address of even full frame buffer 1104 has been reached, panel video end pulse PVD-END 1323, may be generated by the panel row state machine. The current PAN-WR-ADDR 1324, representing the last address of even full frame buffer 1104, may be stored into panel end address latch PEA-LATCH 1302.

Writing to even full frame buffer 1104, the panel end address may be referred to as panel end address even PEA-EVEN. If panel pixel data is written into odd full frame buffer 1103, the address stored into PEA-LATCH 1302 may be panel end address odd PEA-ODD. The panel end address will be used to perform reverse scanning when selecting image rotation.

At the beginning of an odd CRT frame, odd full frame buffer 1103 is written in step 1207, and even full frame buffer 1104 is read in step 1206 and scanned out to flat panel display 903. There may be a one frame time lag for the image displayed on flat panel display 903 from the image displayed on CRT 902. Data stored into even full frame buffer 1104 represents an even panel frame.

CRT-ODD signal 1321 may be high representing an odd CRT frame. This enables eighteen bit PSA-EVEN address to be read from PSAR-EVEN register 1300 and output on bus 1335 into multiplexor 1301. REVERSE-SCAN bit 1320 may be low such that 18 bit PSA-EVEN address propagates through multiplexor 1301 to multiplexor 1305. At the start of an even frame for flat panel display 903, PVD-BEGIN pulse 1331 may be asserted. The PHA-EVEN address from PHA-LATCH output 1326 may be loaded into the lower half of the dual input register 1307. PSA-EVEN address passes through multiplexor 1305 and may be loaded into the register and up-down counter 1304.

PVD-BEGIN signal 1331 strobes PSA-EVEN into up-down counter 1304 and PHA-EVEN into dual input register 1307 via OR gate 1308. PSA-EVEN address propagates through up-down counter 1304 into panel read address PAN-RD-ADDR 1334. PAN-RD-ADDR 1334 propagates through multiplexor 1406 and multiplexor 1407 to become VMEM ADDRESS 1440. Once even full frame buffer 1104 is read, the contents are stored into panel read FIFO 1006. Panel read FIFO 1006 may be incremented to read the next 32 bits of panel pixel data. RDFIFO-INC 1337 may be generated by control logic to increment panel read FIFO 1006 and clock up-down counter 1304.

If REVERSE-SCAN bit 1320 is low, up-down counter 1304 will increment by one when clocked by RDFIFO-INC 1337. Thus, PAN-RD-ADDR 1334 pointing to even full frame buffer 1104 may be incremented and flow through multiplexors 1406 and 1407 as VMEM ADDRESS 1440. Incrementing the LSBs of a panel start address in this manner sequentially increments through the upper half 1108 of even full frame buffer 1104.

Panel read FIFO 1006 contains panel pixel data from even full frame buffer 1104, generating RDFIFO-INC signals until the upper half of panel read FIFO 1006 is full. Panel read FIFO 1006 may be split into four upper and four lower FIFO locations. Once the four locations of the upper half are full, read FIFO full pulse RD-FIFO-FULL 1340 may be generated. DUAL-SCAN-PANEL 1338 generated by control logic may be set high if flat panel display 903 is a dual scan type with upper and lower halves. FULL-FRAME-BUFFER may be set high by control logic as image rotation may use two full frame buffers.

RD-FIFO-FULL propagates through AND gate 1309 and OR gate 1308 storing PAN-RD-ADDR 1334 into the upper half register of dual input register 1307. RD-FIFO-FULL also loads up-down counter 1304 with PHA-EVEN address which may be stored in the lower register of dual input register 1307. PVD-BEGIN pulse may go low such that output 1330 of the dual input register may propagate through multiplexor 1305 into up-down counter 1304. This address may be the panel half address even PHA-EVEN.

While in a panel read cycle, PHA-EVEN address propagates through multiplexors 1406 and 1407 becoming VMEM ADDRESS 1440. After panel pixel data for PHA-EVEN address is read from the lower half of even full frame buffer 1104 and written into panel read FIFO 1006, the RDFIFO-INC signal may be generated. RDFIFO-INC signal 1337 increments the lower half address contained in up-down counter 1304 pointing to even full frame buffer 1104. Up-down counter 1304 may be incremented until the lower half of panel read FIFO 1006 is full.

RD-FIFO-FULL signal 1340 propagates through AND 1309 and OR 1308 as signal 1333 storing the present lower half address into lower register of dual input register 1307. Signal 1333 also loads up-down counter 1304 with an incremented upper half address value, stored in the upper register of the dual input register 1307. In this manner, addresses toggle back and forth between upper and lower halves of even full frame buffer 1104 to simultaneously scan the upper and lower panel half pixel data onto flat panel display 903. This may be illustrated in FIG. 12 in step 1225.

While an even panel frame may be read from even full frame buffer 1104, an odd panel frame may be written into odd full frame buffer 1103. Panel write address logic 1008 generates addresses for odd full frame buffer 1103 which are stored into PHA-LATCH 1303 and PEA-LATCH 1302. PHA-LATCH 1303 may be stored with panel half address odd PHA-ODD and PEA-LATCH 1302 may be stored with panel end address odd PEA-ODD. Thus, when even full frame buffer 1104 is completely read, stored in panel read FIFO 1006, and scanned out onto the panel, panel read address logic 1008 may start generating address locations to read an odd panel frame stored in odd full frame buffer 1103.

As odd full frame buffer 1103 starts to be read, an even CRT frame may be scanned out onto CRT 902. CRT-ODD-FRAME signal may be set low such that PSA-ODD address, stored in PSAR-ODD register 1308, may be output. PSA-ODD may be output onto bus 1335 and pass through multiplexors 1301 as REVERSE-SCAN bit 1320 remains low. Pulse PVD-BEGIN may be high such that PSA-ODD passes through multiplexor 1305 and may be loaded into up-down counter 1304. Pulse PVD-BEGIN also loads panel half address odd PHA-ODD, stored within PHA-LATCH 1303, into the lower register of dual input register 1307. Addresses for odd full frame buffer 1103 may now be generated similar to the addresses for even full frame buffer 1104 discussed above.

During a frame, video display controller 901 switches a CRT R/W cycle to a panel read cycle, a panel write cycle, and a CPU cycle as required. This cycle sequence repeats starting with CRT 902 R/W cycle. Arbitrator 1023 and control logic generate the control signals to manage the various cycles performed around external video memory 907.

Image Rotation and Panel Read Address Logic

If image rotation is selected such that REVERSE-SCAN bit 1320 may be set high during an even CRT frame, an odd panel frame may be scanned onto flat panel display 903 and continues to be scanned as an unrotated image. The next panel read cycle will scan out a panel frame as a rotated image. At the beginning of an odd CRT frame, odd full frame buffer 1103 will be written in step 1207 with an odd panel frame. Even full frame buffer 1104 in step 1206 contains an even panel frame which will be reverse scanned onto the panel to provide a rotated image.

As an even CRT frame is scanned onto CRT 902, an even panel frame may be stored into even full frame buffer 1104. REVERSE-SCAN bit 1320 changes state after an even panel frame is stored into even full frame buffer 1104. REVERSE-SCAN bit 1320 does not affect the current panel read cycle of an odd panel frame. However, during writing of an even panel frame, PHA-LATCH 1303 may not be properly loaded with a correct address to perform image rotation. In this case the hardware or video BIOS software may blank an even panel frame as it is scanned onto the panel.

During the blanking period of an even panel frame, an odd panel frame may be written into odd full frame buffer 1103. As panel pixel data of an odd panel frame is written into odd full frame buffer 1103, the panel read address exceeds upper half panel address generating TOP-HALF-END 1325. PAN-WR-ADDR 1324 may be the first 32 bits of panel pixel data representing the start of scan line 240 of a 640×480 panel. Decrementer LESS ONE 1306 decrements PAN-WR-ADDR 1324 by one. This address value, referred to as panel half address odd less one PHA-ODD LESS ONE 1121, represents the last address within odd full frame buffer 1103 containing panel pixel data for the upper panel half.

REVERSE-SCAN bit 1320 may be set high such that PHA-ODD LESS ONE address passes through multiplexor 1310 and may be input to PHA-LATCH 1303. TOP-HALF-END pulse strobes PHA-ODD LESS ONE address into PHA-LATCH 1303. The panel write cycle continues so the last bits of panel pixel data for an odd panel frame are stored into odd full frame buffer 1103. Pulse PVD-END 1323 may be generated on the last address of odd full frame buffer 1103. PEA-LATCH 1303 may be written with the last address of odd full frame buffer 1103 containing panel pixel data for an odd panel frame. This last address may be referred to as panel end address odd PEA-ODD 1119.

PEA-ODD, an 18 bit address, will pass through multiplexor 1301 if REVERSE-SCAN bit 1320 is set high. As panel read cycle begins on an odd panel frame within odd full frame buffer 1103, pulse PVD-BEGIN 1331 may be generated. Thus, PEA-ODD address passes through multiplexor 1305 and may be loaded into up-down counter 1304. PEA-ODD passes through up-down counter 1304 as PAN-RD-ADDR 1334, flows through multiplexors 1406 and 1407 becoming external video memory 907 address 1440 into external video memory 907.

PHA-ODD LESS ONE stored in PHA-LATCH 1303 may be stored into the lower register of dual input register 1307. Once a 32 bit word of panel pixel data is stored into upper half of panel read FIFO 1006, pulse RDFIFO-INC 1337 may be generated. REVERSE-SCAN bit 1320 may be set high such that up-down counter 1304 counts down by one when it is clocked. RDFIFO-INC decrements current count PEA-ODD within up-down counter 1304. In this manner the address generated by panel read address logic 1008 sequentially decrements from the panel end address.

When the upper half of panel read FIFO 1006 is full, pulse RD-FIFO-FULL may be generated. RD-FIFO-FULL signal propagates through AND gate 1309 and OR gate 1308 generating signal 1333. RD-FIFO-FULL signal stores the present count within up-down counter 1304 into the upper register of dual input register 1307. PHA-ODD LESS ONE address, stored in the lower register of dual input register 1307, may be loaded into up-down counter 1304. Up-down counter 1304 decrements from PHA-ODD LESS ONE address value and generates addresses for upper half 1107 of odd full frame buffer 1103.

Panel pixel data from upper half 1107 of odd full frame buffer 1103 may be loaded into the lower half of panel read FIFO 1006. Decrementing in this manner reverses the sequence of the read address so the upper half of panel pixel data may be scanned onto the lower panel half. Once up-down counter 1304 has decremented to fill the lower half of panel read FIFO 1006, RD-FIFO-FULL pulse may be generated.

RD-FIFO-FULL pulse stores the current value of up-down counter 1304 into the lower register of dual input register 1307. RD-FIFO-FULL pulse reloads the value from the upper register of dual input register 1307 into up-down counter 1304. The present count within the up-down counter represents the address of lower half 1109 of odd full frame buffer 1103 containing panel pixel data which will be scanned onto an upper panel half. Thus, panel read address logic 1008 continues to scan an rotated image of an odd panel frame onto flat panel display 903.

As illustrated in FIG. 11B, the upper panel half starting address, generated by panel read address logic 1008 for an unrotated image, may be either PSA-EVEN 1114 or PSA-ODD 1115. The lower panel half starting address may be either PHA-EVEN 1116 or PHA-ODD 1117. The panel read addresses are generated sequentially for each half of dual scan flat panel display 903 alternating between the upper and lower halves of even full frame buffer 1104 or odd full frame buffer 1103.

If an odd CRT frame is scanned onto CRT 902, even full frame buffer 1104 addresses are generated by panel read address logic 1008. Even full frame buffer 1104 addresses are incremented sequentially from PSA-EVEN and PHA-EVEN as indicated by down arrows 1154 and 1156. If an even CRT frame is scanned onto CRT 902, odd full frame buffer 1103 addresses are generated by panel read address logic 1008. Odd full frame buffer 1103 addresses are incremented sequentially from PSA-ODD and PHA-ODD as indicated by down arrows 1157 and 1159.

If image rotation is selected, the upper panel half starting address in external video memory 907 may be PEA-EVEN 1118 or PEA-ODD 1119 as illustrated by FIG. 11D. In this case the lower panel half starting address may be either PHA-EVEN LESS ONE 1120 or PHA-ODD LESS ONE 1121. The panel read addresses are generated sequentially from these values for each half of the dual scan flat panel display 903, alternating between the upper and lower halves of even full frame buffer 1104 or odd full frame buffer 1103.

If an odd CRT frame is scanned onto CRT 902, even full frame buffer 1104 addresses are generated by panel read address logic 1008. Even full frame buffer 1104 addresses are incremented sequentially from PEA-EVEN and PHA-EVEN LESS ONE as indicated by up arrows 1166 and 1164. If an even CRT frame is scanned onto CRT 902, odd full frame buffer 1103 addresses are generated by panel read address logic 1008. Odd full frame buffer 1103 addresses are incremented sequentially from PEA-ODD and PHA-ODD LESS ONE as indicated by up arrows 1169 and 1167.

Image Rotation for a Single Scan Flat Panel Display

For a single scan flat panel display, the read address logic and panel pixel data path are slightly modified. Panel write address logic 1008 is not modified for a single scan flat panel display. FIG. 10A shows panel read FIFO 1006 modified to support monochrome single scan flat panel display 903. Rather than split panel read FIFO 1006 into two four word by 32 bit FIFOs, panel read FIFO 1006 becomes a single eight word by 32 bit FIFO. The upper and lower halves are indistinguishable and only the upper data path is used. Thus only upper left-right shift register 1021 operates for single scan flat panel display 903.

Panel interface logic may be input with control information indicating a single scan flat panel display is to be used and respond accordingly by reading only upper left-right shift register 1021. For a color single scan flat panel display 903, the modifications to FIG. 10B are similar.

Panel read address logic 1008 illustrated in FIG. 13 may be modified follows. DUAL-SCAN-PANEL signal may be set low such that when RD-FIFO-FULL signal 1340 is generated, it does not toggle PAN-RD-ADDR 1334 into upper or lower halves of a full frame buffer. Up-down counter 1304 may be loaded with a new starting value when PVD-BEGIN signal is generated at the beginning of a new panel frame. This loads the PSA-EVEN or PSA-ODD into up-down counter 1304 such that it may increment from these values in a unrotated mode.

If image rotation is selected, PVD-BEGIN signal loads PEA-EVEN or PEA-ODD signal into up-down counter 1304. Up-down counter 1304 decrements from this value to generate a reverse sequence of read addresses into even full frame buffer 1104 or odd full frame buffer 1103. Panel half addresses, PHA-EVEN and PHA-ODD may not be utilized when driving a single scan flat panel display.

The present invention has described herein using a common flat panel display pixel format (dimension), 640 pixels by 480 pixels. However, other pixel formats may be used without departing from the spirit and scope of the invention by suitably modifying the panel state machines, panel control logic 901, and panel space in external video memory 903.

While a preferred embodiment of the present invention has been disclosed and described in detail herein, various changes in form and detail may be made therein without departing from the spirit and scope thereof. For example, although the present invention describes rotating an image on a flat panel display, the present invention may also be applied to provide image rotation on other types of displays such as CRT displays or the like. Further, the present invention may also be applied to selectively rotate an image on two or more displays, either simultaneously or selectively. In addition, although the present invention describes the use of reverse addressing to provide 180° rotation, other angle of rotation may be applied using other types of addressing techniques. For example, an image may be inverted (i.e., left to right) by using an addressing technique wherein only rows of pixels are read out in reverse order. Similarly, other video effects may also be achieved by altering the address order. For example, in a color (e.g., RGB or the like) display, altering the order of the subpixels may produce an image having altered color schemes (e.g., photonegative or the like).

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It may be therefore intended that the protection granted hereon be limited only by the definition contained in the appended claims and equivalents thereof.

What is claimed is:

1. Apparatus for displaying a video image on at least one video display, said video image stored as pixel data in a memory in a first sequence, said apparatus comprising:

scanning means, coupled to said memory and said at least one video display, for both reading image data from said memory in a prescribed sequence and scanning said image data to said video display in said prescribed sequence; and selector means coupled to the scanning means for selecting a first sequence or a second sequence different from said first sequence as said prescribed sequence.

2. The apparatus of claim 1, wherein said second sequence comprises an inverse ordering of said first sequence.

3. The apparatus of claim 2, wherein said at least one video display comprises a first video display and a second video display.

4. The apparatus of claim 3, wherein said scanning means reads said image data from said memory in said second sequence and scans said image data to said second video display in said second sequence and said scanning means reads said image data from memory in said first sequence and scans said video display in said first image data to said first video display in said first sequence.

5. The apparatus of claim 4, wherein said image scanned onto said second video display is rotated with respect to said image scanned onto said first video display.

6. The apparatus of claim 5, wherein said image scanned onto said second video display is rotated 180° with respect to said image scanned onto said first video display.

7. The apparatus of claim 1, wherein said first sequence comprises a sequence of repeating sub-sequences of pixel data.

8. The apparatus of claim 7, wherein said second sequence comprises an inverse ordering of said sequence of repeating sub-sequences of pixel data.

9. A method of displaying and selectively rotating an image on an image display unit, comprising steps of:

in a memory, storing a frame of pixel data in a first sequence corresponding to said image, wherein said first sequence comprises a sequence of repeating sub-sequence;

from said memory, selectively reading a pixel of image data corresponding to said frame in said first sequence or a second sequence different from the first sequence; and converting said pixel of image data to corresponding display unit drive signals.

10. The method of claim 9, wherein said second sequence comprises an inverse ordering of said first sequence.

11. The method of claim 9, wherein said second sequence comprises an inverse ordering of said sequence of repeating sub-sequences.

12. A method of claim 9, wherein said image is scanned onto a first video display and a second video display, and wherein said image scanned onto said second video display is rotated with respect to said image scanned onto said first video display.

13. The method of claim 12, wherein said image scanned onto said second video display is rotated 180° with respect to said image scanned onto said first video display.

14. Apparatus for simultaneously displaying first and second video images on first and second video displays, comprising:

memory means for storing at least first image data;

first scanning means, coupled to said memory means and said first video display, for reading said first image data and scanning said first image data on said first video display;

data conversion means, coupled to said memory means and said first scanning means, for receiving said first scanned image data and converting said first scanned image data into second image data and storing said second image data in said memory in a first sequence; and second scanning means, coupled to said memory means and said second video display, for reading said second image data from said memory in a prescribed sequence and scanning said second image data on said second video display.

15. The apparatus of claim 14, further comprising:

selector means, coupled to said second scanning means, for selecting said second sequence as the prescribed sequence.

16. The apparatus of claim 15, wherein said second sequence comprises an inverse ordering of said first sequence.

17. The apparatus of claim 16, wherein said first sequence comprises a sequence of repeating sub-sequences.

18. The apparatus of claim 17, wherein said second sequence comprises an inverse ordering of said sequence of repeating sub-sequences.

19. The apparatus of claim 18, wherein said image scanned onto said second video display is rotated with respect to said image scanned onto said first video display.

20. The apparatus of claim 19, wherein said image scanned onto said second video display is rotated 180° with respect to said image scanned onto said first video display.

* * * * *